(12) United States Patent
Jurbergs et al.

(10) Patent No.: US 6,393,175 B1
(45) Date of Patent: May 21, 2002

(54) INTEGRATED FIBER ARRAY OPTICAL SWITCH AND METHOD OF OPERATION

(75) Inventors: David C. Jurbergs, Fort Worth; Chris Karaguleff; Kenneth C. Noddings, both of Austin; Robert O. Miller, Carrollton; Daniel J. Mockler, Midlothian, all of TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/713,874

(22) Filed: Nov. 15, 2000

(51) Int. Cl.[7] ................................ G02B 6/42
(52) U.S. Cl. ........................ 385/20; 385/16
(58) Field of Search .............. 385/16–24, 14, 385/2, 40

(56) References Cited

U.S. PATENT DOCUMENTS

| | | | |
|---|---|---|---|
| 4,121,884 A | 10/1978 | Greenwood | 350/96.15 |
| 4,504,121 A | 3/1985 | Carlsen et al. | 350/385 |
| 4,634,239 A | 1/1987 | Buhrer | 350/486 |
| 4,639,074 A | 1/1987 | Murphy | 350/96.15 |
| 4,725,114 A | 2/1988 | Murphy | 350/96.17 |
| 4,796,975 A | 1/1989 | Lukas et al. | 350/320 |
| 4,966,433 A | 10/1990 | Blonder | 350/96.17 |
| 5,031,987 A | 7/1991 | Norling | 350/96.15 |
| 5,044,711 A | 9/1991 | Saito | 350/96.2 |
| 5,197,109 A | 3/1993 | Ichigi et al. | 385/50 |
| 5,221,987 A | 6/1993 | Laughlin | 359/222 |
| 5,225,887 A | 7/1993 | Lipson et al. | 356/345 |
| 5,369,718 A | 11/1994 | Kamata et al. | 385/21 |
| 5,444,801 A | 8/1995 | Laughlin | 385/16 |
| 5,553,175 A | 9/1996 | Laughlin | 385/16 |
| 5,555,327 A | 9/1996 | Laughlin | 385/16 |
| 5,555,558 A * | 9/1996 | Laughlin | 385/16 |
| 5,566,260 A | 10/1996 | Laughlin | 385/16 |
| 5,600,745 A | 2/1997 | Wuu et al. | 385/49 |
| 5,640,477 A | 6/1997 | Anderson | 385/89 |
| 5,647,033 A | 7/1997 | Laughlin | 385/16 |
| 5,717,803 A | 2/1998 | Yoneda et al. | 385/89 |
| 5,721,797 A | 2/1998 | Basavanhally et al. | 385/49 |
| 5,732,168 A | 3/1998 | Donald | 385/16 |
| 5,737,467 A | 4/1998 | Kato et al. | 385/92 |
| 5,764,832 A | 6/1998 | Tabuchi | 385/49 |
| 5,828,799 A | 10/1998 | Donald | 385/16 |
| 5,841,916 A | 11/1998 | Laughlin | 385/16 |
| 5,875,271 A | 2/1999 | Laughlin | 385/16 |
| 5,905,831 A | 5/1999 | Boudreau et al. | 385/88 |
| 5,909,301 A | 6/1999 | Laughlin | 359/222 |
| 5,917,641 A | 6/1999 | Laughlin | 359/222 |

* cited by examiner

Primary Examiner—Phan T. H. Palmer
(74) Attorney, Agent, or Firm—Baker Botts L.L.P.

(57) ABSTRACT

An optical switch includes an input member, a reflective output member coupled to the input member, and a transmissive output member. The input member supports a plurality of input waveguides, each input waveguide having a reflective surface and operable to receive a corresponding optical signal. The reflective output member supports a plurality of first output waveguides, each first output waveguide coupled to a corresponding input waveguide. The transmissive output member supports a plurality of second output waveguides and has a first position spaced apart from the input member such that the reflective surface of each input waveguide totally internally reflects a corresponding optical signal to a corresponding one of the first output waveguides, and a second position in proximal contact with the input member such that each second output waveguide frustrates the total internal reflection of a corresponding input waveguide and receives a corresponding optical signal.

28 Claims, 12 Drawing Sheets

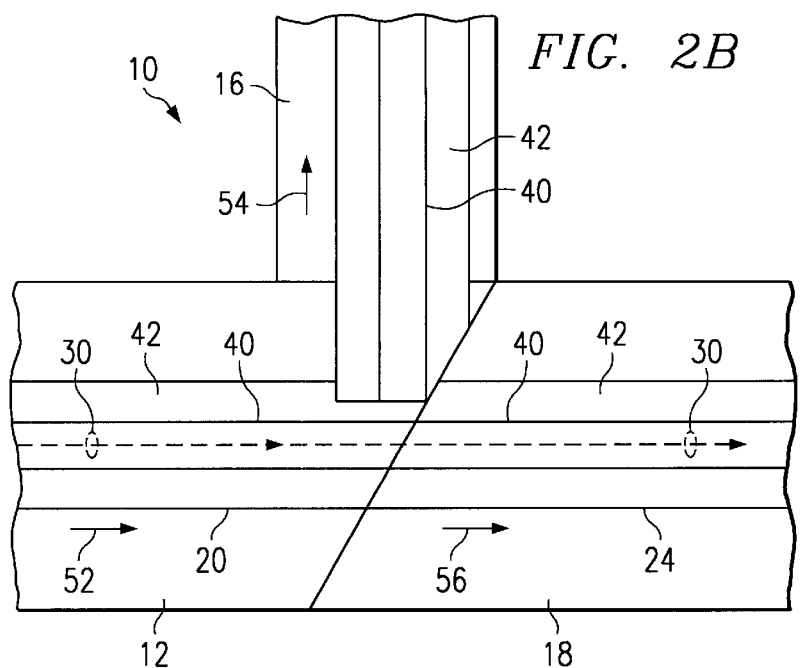
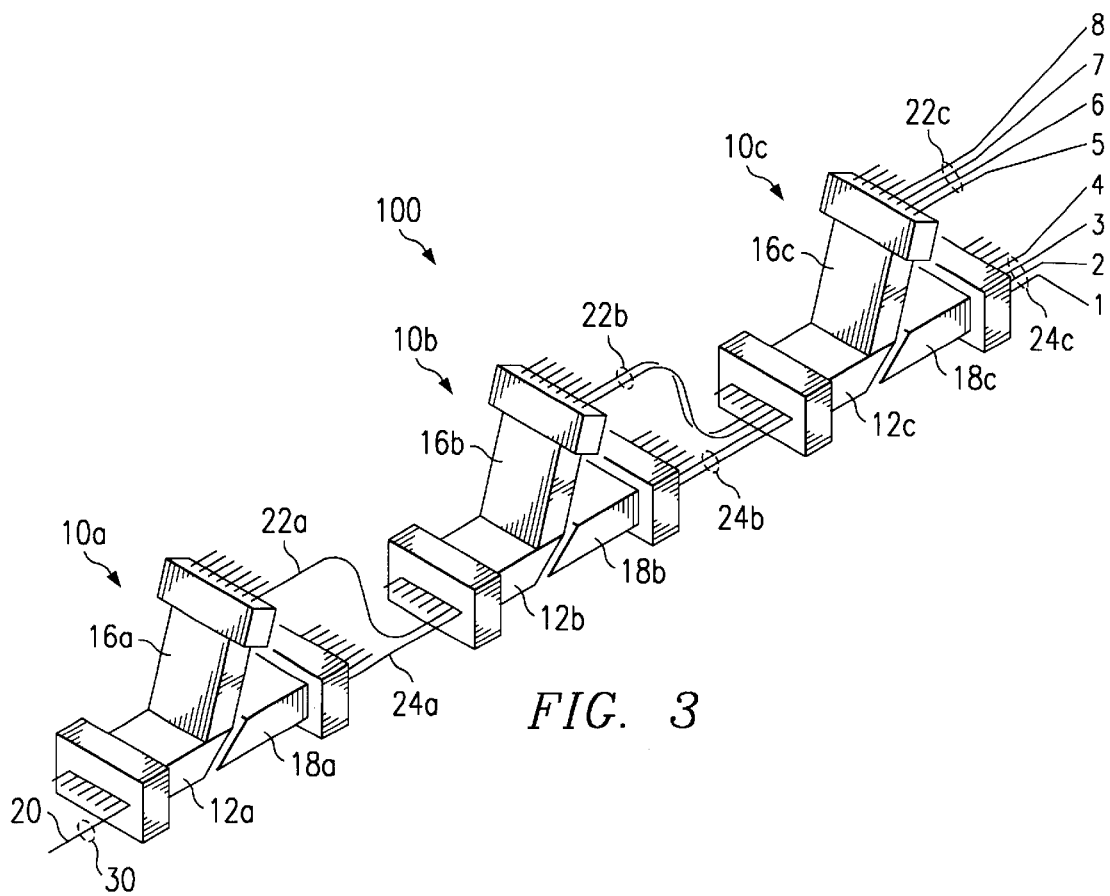

| | SWITCH 10a STATE | SWITCH 10b STATE | SWITCH 10c STATE | OUT CHANNEL |
|---|---|---|---|---|
| 160 | OFF | OFF | OFF | 8 |
| 162 | OFF | OFF | ON | 4 |
| 164 | OFF | ON | OFF | 6 |
| 166 | OFF | ON | ON | 2 |
| 168 | ON | OFF | OFF | 7 |
| 170 | ON | OFF | ON | 3 |
| 172 | ON | ON | OFF | 5 |
| 174 | ON | ON | ON | 1 |

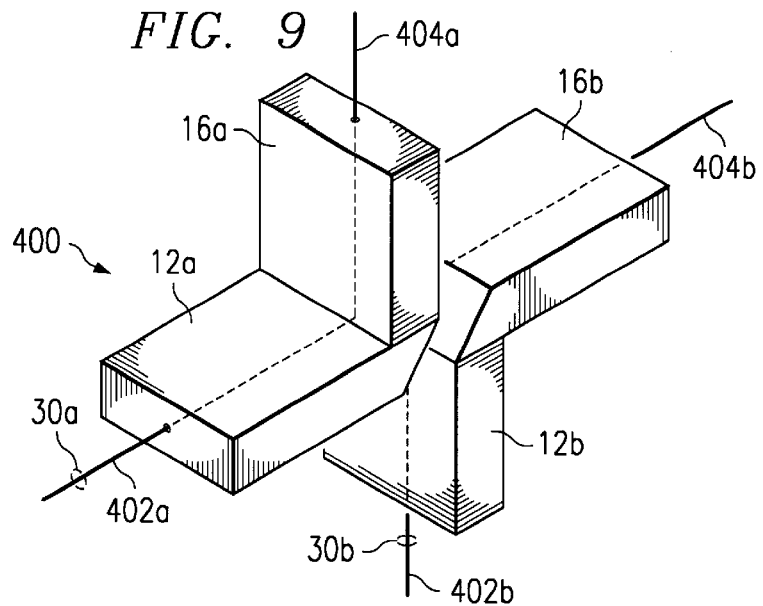
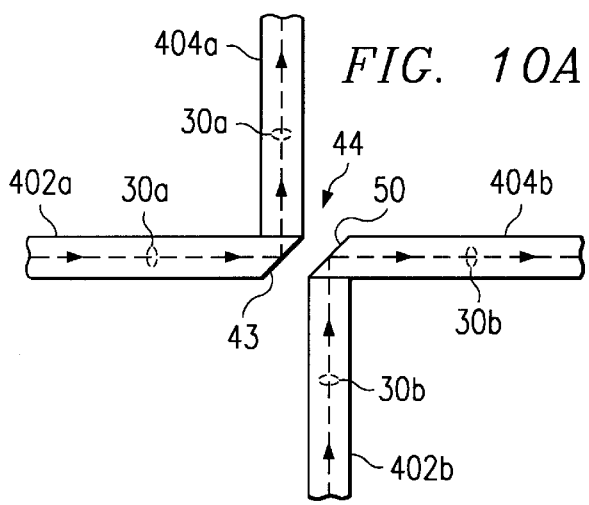
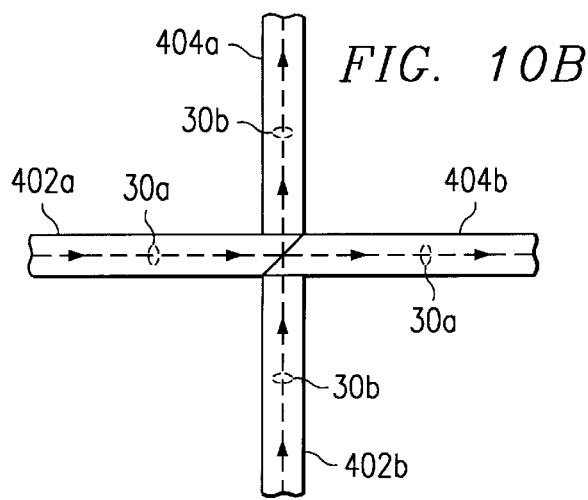

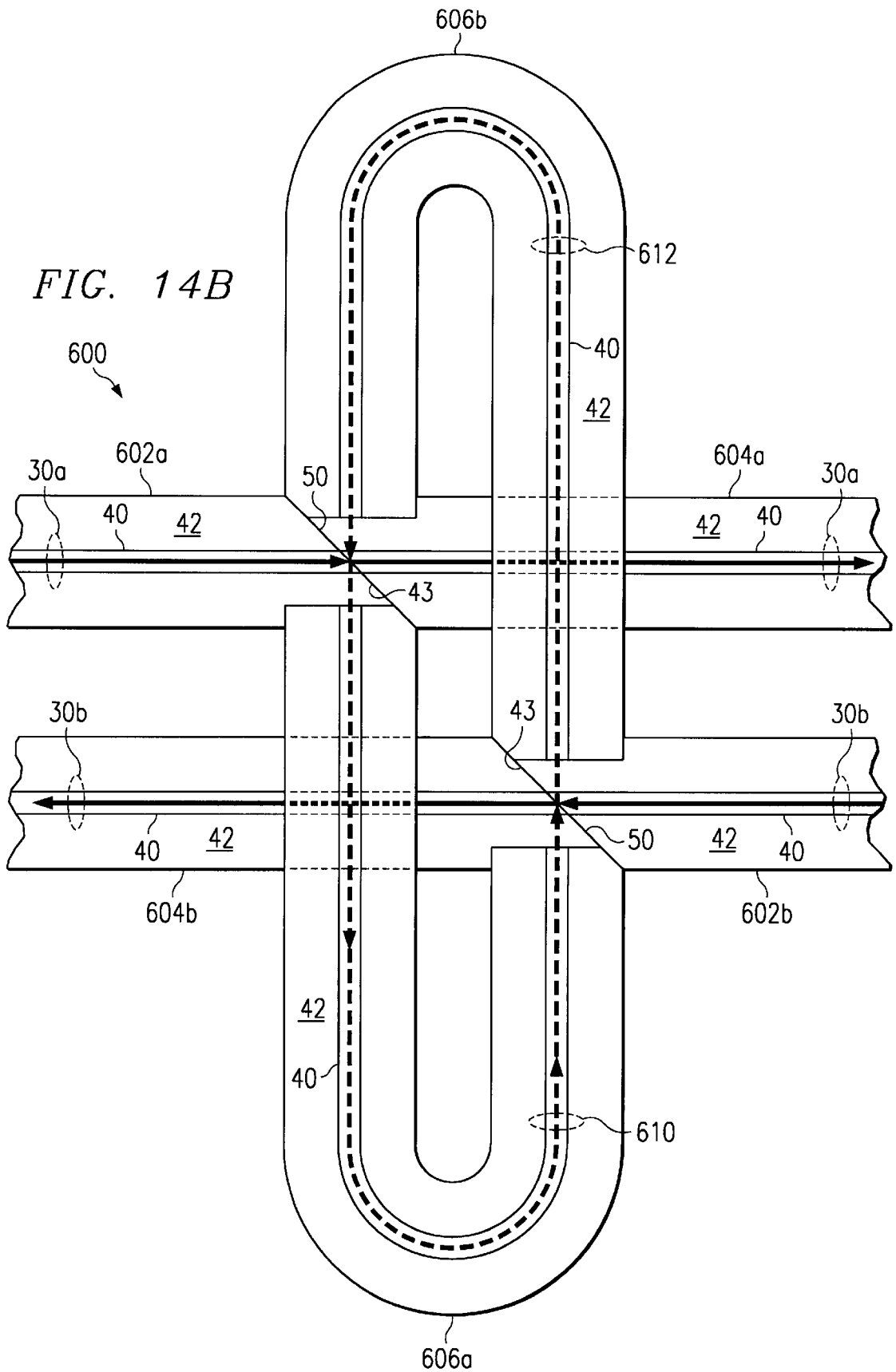

US 6,393,175 B1

INTEGRATED FIBER ARRAY OPTICAL SWITCH AND METHOD OF OPERATION

CROSS-REFERENCE TO RELATED APPLICATIONS

This application is related to and filed concurrently with pending U.S. patent application Ser. No. 09/713,869 filed Nov. 15, 2000, entitled "2×2 Integrated Fiber Array Optical Switch and Method of Operation," pending U.S. patent application Ser. No. 09/713,873 filed Nov. 15, 2000, entitled "Cascaded Integrated Fiber Array Optical Switch and Method of Operation," and pending U.S. patent application Ser. No. 09/713,924 filed Nov. 15, 2000, entitled "Integrated Fiber Array Optical Switch Using Double-Pass Propagation and Method of Operation." These applications have been commonly assigned to Optical Switch Corporation.

TECHNICAL FIELD OF THE INVENTION

This invention relates to the field of total internal reflection devices and more particularly to an integrated fiber array optical switch.

BACKGROUND OF THE INVENTION

Fiber-optic communication systems include optical components, such as optical fibers coupled to switching components, that receive, transmit, and otherwise process information in optical signals. The switching components in a fiber-optic communication system selectively direct the information carried by the optical signal to one or more other optical components. A problem with existing fiber-optic communication systems is that they require many complex optical components to perform the switching function. This adds to the cost and size of the fiber-optic communication system. It also leads to slower switching speeds and difficulties with aligning the switching components.

SUMMARY OF THE INVENTION

An integrated fiber array optical switch is provided that substantially eliminates or reduces disadvantages and problems associated with previous optical switches.

In accordance with one embodiment of the present invention, an optical switch includes an input member, a reflective output member coupled to the input member, and a transmissive output member. The input member supports a plurality of input waveguides, each input waveguide having a reflective surface and operable to receive a corresponding optical signal. The reflective output member supports a plurality of first output waveguides, each first output waveguide coupled to a corresponding input waveguide. The transmissive output member supports a plurality of second output waveguides and has a first position spaced apart from the input member such that the reflective surface of each input waveguide totally internally reflects a corresponding optical signal to a corresponding one of the first output waveguides, and a second position in proximal contact with the input member such that each second output waveguide frustrates the total internal reflection of a corresponding optical signal and receives a corresponding optical signal.

Another embodiment of the present invention is an optical switch that includes an input member, a reflective output member coupled to the input member, and a transmissive output member. The input member supports a first input waveguide, a second input waveguide, a first output waveguide, and a second output waveguide. The first input waveguide has a reflective surface and receives a first optical signal and the second input waveguide has a reflective surface and receives a second optical signal. The reflective output member supports a first return loop waveguide that couples the first input waveguide to the first output waveguide, and a second return loop waveguide that couples the second input waveguide to the second output waveguide. The transmissive output member supports a third return loop waveguide that couples the first input waveguide to the second output waveguide, and a fourth return loop waveguide that couples the second input waveguide to the first output waveguide.

The transmissive output member has a first position spaced apart from the input member such that the reflective surface of the first input waveguide totally internally reflects the first optical signal to the first return loop waveguide for communication to the first output waveguide and the reflective surface of the second input waveguide totally internally reflects the second optical signal to the second return loop waveguide for communication to the second output waveguide. The transmissive output member also has a second position in proximal contact with the input member such that the third return loop waveguide frustrates the total internal reflection of the first input waveguide and receives the first optical signal for communication to the second output waveguide and the fourth return loop waveguide frustrates the total internal reflection of the second input waveguide and receives the second optical signal for communication to the first input waveguide.

Yet another embodiment of the present invention is an optical switch that includes a first input member, a first reflective output member coupled to the first input member, a first transmissive output, a second input member, a second reflective output member coupled to the second input member, and a second transmissive output.

The first input member supports a first input waveguide having a reflective surface and operable to receive an optical signal. The first reflective output supports a first intermediate waveguide coupled to the first input waveguide. The first transmissive output member supports a second intermediate waveguide and has a first position spaced apart from the input member such that the reflective surface of the input waveguide totally internally reflects the optical signal to the first intermediate waveguide, and a second position in proximal contact with the input member such that the second intermediate waveguide frustrates the total internal reflection of the input waveguide and receives the optical signal.

The second input member supports the first intermediate waveguide having a reflective surface and the second intermediate waveguide having a reflective surface. The second reflective output member supports a first output waveguide coupled to the first intermediate waveguide and a second output waveguide coupled to the second intermediate waveguide. The second transmissive output member supports a third output waveguide and a fourth output waveguide, and has a first position spaced apart from the second input member and a second position in proximal contact with the second input member.

Another embodiment of the present invention is an optical switch that includes an input member, a reflective output member coupled to the input member, and a transmissive output member. The input member supports an input waveguide having a reflective surface and operable to receive an optical signal. The reflective output member supports a first output waveguide and a return loop waveguide that is coupled to the input waveguide and the first output waveguide. The transmissive output member supports a second output waveguide and has a first position spaced apart from the input member such that the reflective surface of the input waveguide totally internally reflects the optical signal toward the return loop waveguide for communication to the first output waveguide. The transmissive output member further has a second position in proximal contact with the input waveguide such that the second output waveguide frustrates the total internal reflection of the optical signal and receives the optical signal.

Technical advantages of the present invention include an optical switch that switches one or more optical signals using waveguides. By using waveguides to guide an optical signal to the switching region and to perform the switching operation, the present invention eliminates the need for costly and sometimes complex optical components. This results in a smaller packing density for the optical switch of the present invention and a more efficient, faster switching operation.

Another technical advantage provided by the present invention is that the optical switches described herein support an array of input and output waveguides to facilitate the simultaneous switching of multiple channels of an optical switch using a common actuator. Yet another technical advantage provided by the present invention is that by cascading a number of optical switches in a particular arrangement, and by selectively operating each individual optical switch, an N×M optical switch may be constructed.

While in a switched state, the contact surface of a waveguide is typically placed in proximal contact with a reflective surface of another waveguide to frustrate the total internal reflection of the optical signal. A small portion of the optical signal may be reflected, however, at the reflective surface and processed as though the switch is operating in the unswitched state. This undesired result is one source of a cross-talk signal in the system.

Another technical advantage provided by the present invention is that the optical switches described herein reduce the effects of a cross-talk signal generated by the above-identified reflection. In particular, the optical switches of the present invention process any cross-talk signals so that a large portion of a cross-talk signal is not received by an optical component of the optical switch. The negative effects of a cross-talk signal are thereby reduced.

For example, in the switched state, an undesired cross-talk signal resulting from a residual reflection at the FTIR interface between a reflective surface and a contact surface is further processed by a return-loop waveguide to reduce the crosstalk signal intensity. In particular, the crosstalk signal radiation is conveyed by the return-loop waveguide to a second FTIR interface within the output waveguide signal path. In the switched state this second FTIR waveguide interface frustrates the total internal reflection of the crosstalk signal at the reflective surface of the output waveguide. As a result, the small, undesired residual portion of the original optical signal undergoes further reduction in its intensity at this second FTIR interface. Therefore, only a negligible portion of the original optical signal, if any, comprises a crosstalk signal that may actually reach an optical component of the switch. Thus, the crosstalk signal is dissipated and its effects become negligible. This technique is referred to as double-pass propagation. The reduction in the magnitude of the crosstalk signal in the present invention will be referred to as a crosstalk improvement.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein:

FIG. 2B illustrates the 1×2 optical switch operating in a switched mode;

FIG. 3 illustrates a 1×8 embodiment of an optical switch in accordance with the present invention;

FIG. 9 illustrates yet another 2×2 embodiment of an optical switch in accordance with the present invention;

FIG. 10A illustrates the 2×2 optical switch operating in an unswitched mode;

FIG. 10B illustrates the 2×2 optical switch operating in a switched mode;

FIG. 14B illustrates the 2×2 optical switch using a return loop waveguide operating in a switched mode.

DETAILED DESCRIPTION OF THE INVENTION

Figure 1:
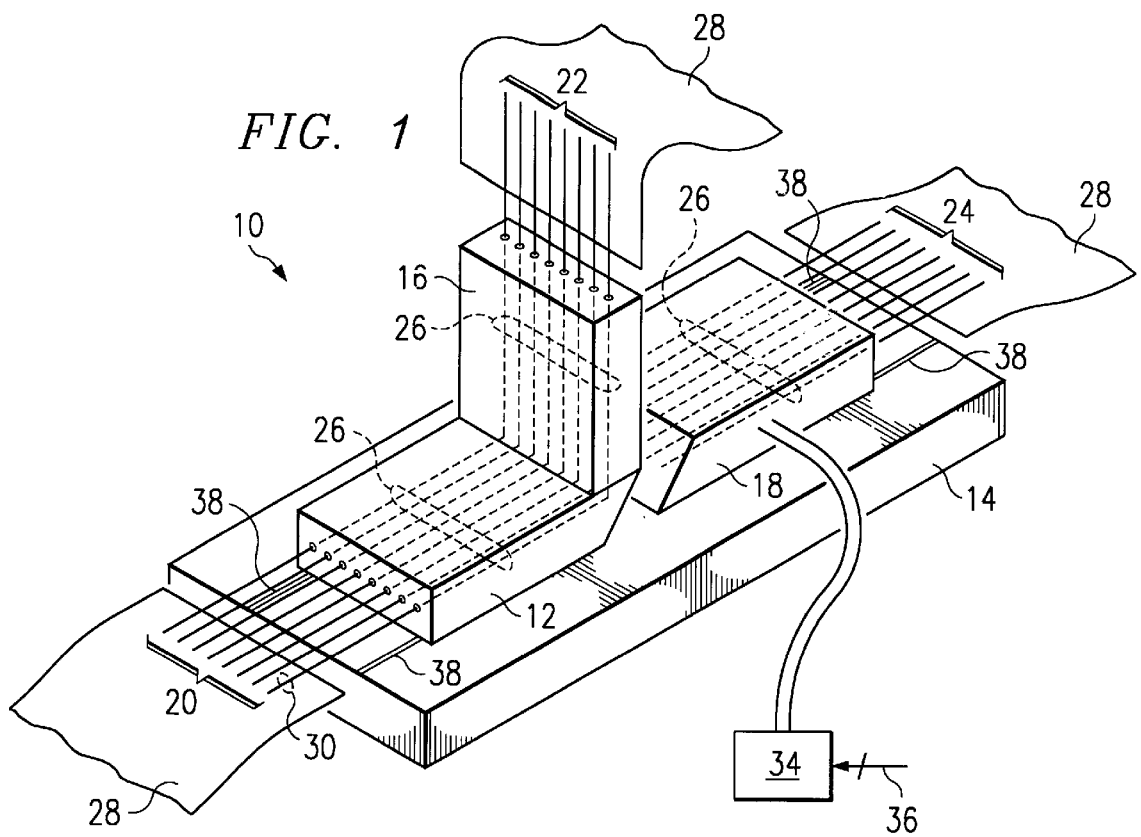
FIG. 1 illustrates a 1×2 embodiment of an optical switch in accordance with the present invention.

FIG. 1 illustrates one embodiment of an optical switch 10 that includes an input member 12 coupled to a baseplate 14, a reflective output member 16 coupled to input member 12, and a transmissive output member 18. Input member 12 supports a plurality of input waveguides 20 and each waveguide 20 may receive and transmit a corresponding optical signal 30. Reflective output member 16 supports a plurality of first output waveguides 22. Each output waveguide 22 is coupled at one end to one end of a corresponding input waveguide 20. Transmissive output member 18 supports a plurality of second output waveguides 24. In general, each input waveguide 20 of optical switch 10 receives an optical signal 30 and selectively communicates the corresponding signal 30 to a corresponding output waveguide 22 and/or output waveguide 24 based upon the position of transmissive output member 18. In this respect, FIG. 1 illustrates a multi-channel 1×2 optical switch 10.

Input member 12, reflective output member 16, and transmissive output member 18 each comprise a structure made of an appropriate material, such as, for example, silicon, that supports each respective waveguide 20, 22, and 24. Members 12, 16, and 18 may be formed having grooves 26 extending from a first face to a second face of the member 12, 16, and 18. Grooves 26 may comprise V-grooves formed on the surface of a member 12, 16, or 18, or a channel formed within a member 12, 16, or 18. Waveguides 20, 22, and 24 may be positioned in members 12, 16, and 18, respectively, along a corresponding groove 26. In this respect, grooves 26 are used for the precise placement, support, and coupling of the appropriate waveguides 20, 22, and 24. One advantage of members 12, 16, and 18 is that the silicon material can be patterned and implanted to provide a functional electrical circuit for electronic actuation for use in optical switch 10. Another advantage of members 12, 16, and 18 is that they support an array of waveguides 20, 22, and 24 to facilitate the simultaneous switching of multiple channels using a common actuator.

Waveguides 20, 22, and 24 each comprise an optical waveguide formed by any arrangement of suitable optically transmissive material that communicates optical signal 30 as a guided wave of energy. In one embodiment of switch 10, waveguides 20, 22 and 24 each comprise optical fibers (referred to generally as input optical fibers 20, and output optical fibers 22 and 24). Optical signals 30 comprise visible light, infrared radiation, ultraviolet radiation, or any other suitable optical beam propagating at any suitable wavelength.

In another embodiment of switch 10, waveguides 20, 22, and 24 each comprise a planar waveguide formed in an appropriate refractive material, such as, for example, silicon dioxide, having a particular index of refraction at a particular wavelength of optical signal 30. The materials used to form waveguides 20–24 in the surrounding refractive materials may be selected to provide particular indices of refraction that are higher than that of the surrounding refractive materials such that waveguides 20–24 communicate signal 30 as a guided wave of energy. In this respect, each of waveguides 202–4 is operable to guide the flow of radiant energy along a path parallel to its axis and to contain the energy of signal 30 within or adjacent to its surface.

In yet another embodiment of switch 10, a portion of waveguides 20, 22, and 24 comprise optical fibers while the remaining waveguides 20, 22, and 24 comprise planar waveguides to form a hybrid optical fiber/planar waveguide switch 10. For example, waveguides 20 may comprise planar waveguides while waveguides 22 and 24 comprise optical fibers. In another example, a portion of waveguides 20 and corresponding waveguides 22 and 24 comprise planar waveguides, while the remaining portion of waveguides 20 and corresponding waveguides 22 and 24 comprise optical fibers.

Ribbon array 28 comprises a strip or band made from resin, cloth, plastic, or any other suitable material. In general, any suitable number and combination of waveguides 20, 22, and 24 are bundled in a ribbon array 28 to position, align, or otherwise support waveguides 20, 22, and 24 with relation to members 12, 16, and 18.

Actuator 34 generally comprises a piezoelectric device, a bimorph transducer, an electromagnetic device, or any other suitable actuation device coupled to transmissive output member 18 that displaces member 18 in response to an electrical, thermal, or otherwise appropriate control signal 36. Activating and deactivating actuator 34 coupled to transmissive output member 18 places member 18 in a selected one of the first or second positions such that waveguides 24 are brought out of or into proximal contact with waveguides 20.

Aligning rails 38 comprise any suitable structure that aligns members 12, 16, and 18 with respect to each other. In one embodiment, aligning rails 38 comprise any suitable structure, such as, for example, optical fibers or ridges, placed in a channel formed by corresponding V-grooves on the appropriate surfaces of baseplate 14, input member 12, and transmissive output member 18. For example, V-grooves may be formed on a surface of baseplate 14. Corresponding V-grooves may be formed on corresponding surfaces of input member 12 and transmissive output member 18, to form a channel in which the fiber is placed to align members 12, 16, and 18.

In another example, grooves may be formed on a surface of input member 12 and a surface of transmissive output member 18. A ridge may be formed on the corresponding surface of baseplate 14 to form aligning rails 18. Of course, grooves may also be formed on a surface of baseplate 14 with grooves formed on the corresponding surfaces of members 12 and 18.

In another embodiment, aligning rails 28 comprise a combination of holes and pins correspondingly formed in input member 12 and output member 18 to control alignment. For example, member 12 may be formed having holes that extend inward from a first face. Member 18 may be formed having pins that extend outward from a first face and that mate with the holes formed in member 12. By appropriately mating the pins of member 18 with the holes of member 12, members 12 and 18 may be aligned. Of course, the holes may also be associated with member 18 and the pins associated with member 12 to accomplish the same alignment.

In general, aligning rails 38 may be positioned in both the x-axis and y-axis directions to align and/or fix members 12 and 18 with respect to each other and baseplate 14. For example, aligning rails 38 may be used as "tracks" to align transmissive output member 18 with input member 12 as member 18 is actuated between first and second positions on baseplate 14. In another example, aligning rails 38 may be used to fix input member 12 in a particular x-y position with respect to baseplate 14.

In yet another example, aligning rails 38 may be used to control the range of movement of output member 18. This is accomplished by forming a groove on the surface of member 18 in a direction orthogonal to the direction of movement of member 18. A fiber is then placed in the channel formed by the corresponding grooves of member 18 and baseplate 14. The groove of member 18 has a width that is generally greater than the width of the groove formed on the surface of baseplate 14. In one embodiment, the groove of member 18 is formed wide enough to allow member 18 to travel a predetermined distance before the fiber stops the movement of member 18 at either the first position spaced apart from member 12 or the second position in proximal contact with member 12. The extra width of the groove formed on the surface of member 18 facilitates precision control of the movement of member 18 with respect to input member 12.

In another embodiment, member 18 is formed with the extra wide groove as discussed above. However, baseplate 14 is formed with a ridge that, in combination with the groove of member 18, controls the movement of member 18 with respect to input member 12. It should be understood that baseplate 14 may be formed with a wider groove than that of member 18 and/or member 18 may be formed with a ridge, to accomplish the same results described above without departing from the scope of the present invention.

In operation, optical switch 10 communicates each optical signal 30 from an input fiber 20 to a corresponding output optical fiber 22 when transmissive output member 18 is spaced apart from input member 12, as described in greater detail with reference to FIG. 2A. When transmissive output member 18 is placed in proximate contact with input member 12, optical switch 10 communicates each optical signal 30 from an input fiber 20 to a corresponding output optical fiber 24, as described in greater detail with reference to FIG. 2B.

Figure 2A:
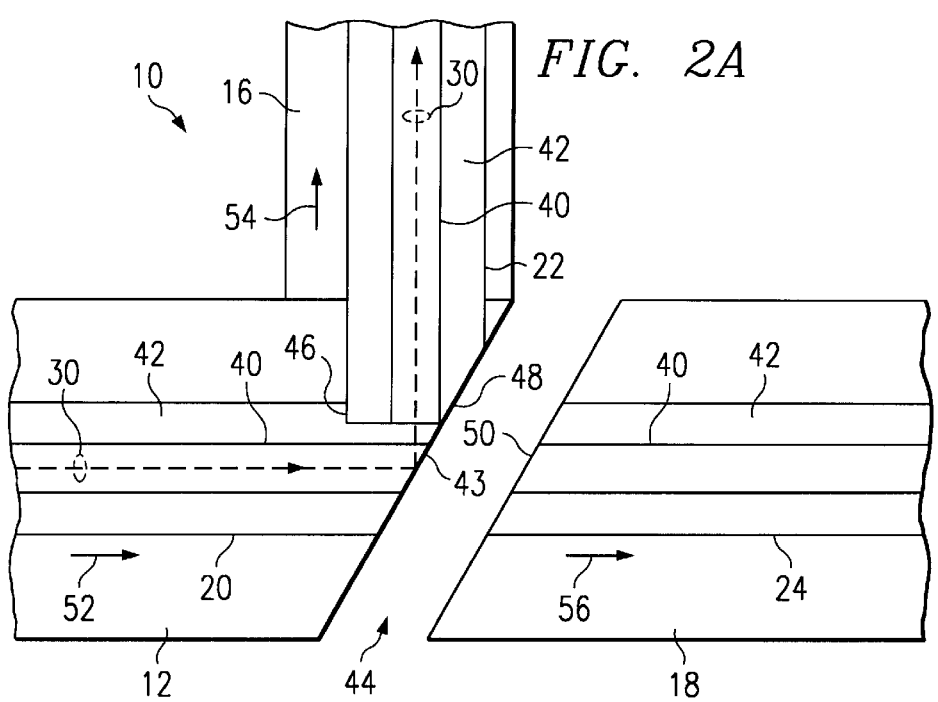
FIG. 2A illustrates the 1×2 optical switch operating in an unswitched mode.

FIGS. 2A and 2B illustrate in more detail the arrangement of an input optical fiber 20 and the corresponding output optical fibers 22 and 24 of switch 10. Although FIGS. 2A and 2B illustrate an arrangement of a single channel of fibers 20, 22, and 24, switch 10 supports multiple channels of fibers 20, 22, and 24. Each of fibers 20, 22, and 24 includes a core 40 designed to transmit or receive information in the form of light pulses, and a cladding 42 that surrounds core 40 to prevent signal 30 from escaping core 40 during transmission. Each core 40 of optical fibers 20–24 comprises any suitable refractive material, such as glass, having a particular index of refraction. Each cladding 42 of optical fibers 20–24 comprises any suitable refractive material, such as glass, having an index of refraction lower than that of the corresponding core 40 such that signal 30 propagates along the longitudinal axis of an optical fiber 20–24. Optical fibers 20–24 may comprise a multi-mode fiber having a large core (e.g., 50 or 62.5 microns wide) or a single mode fiber having a small core (e.g., 9 microns wide). Although the following description is detailed with reference to fibers 20–24 having a circular cross-section, it should be understood that the cross-section of fibers 20–24 may have any suitable shape, including, but not limited to, an oval or a circle having grooves or notches.

Input optical fiber 20 comprises reflective surface 43 that forms an interface between fiber 20 and a refractive material 44. Reflective surface 43 of each input optical fiber 20 is at a bias angle with respect to the longitudinal axis of the input optical fiber 20. In general, input member 12 comprises a contact face that is at an angle substantially similar to the bias angle of a reflective surface 43 of an input optical fiber 20. This bias angle may be selected to yield any desired angle of propagation of signal 30 that is totally internally reflected by reflective surface 43. Therefore, although the bias angle of fiber 20 is illustrated as totally internally reflecting signal 30 at a ninety degree angle in FIG. 2A, the bias angle may be selected to totally internally reflect signal 30 at any suitable angle of propagation.

In one embodiment of switch 10, a portion of cladding 42 of fiber 20 is cleaved, etched, lapped, polished, or otherwise removed to form a notch 46 so that fiber 22 may be positioned in closer proximity to core 40 of fiber 20. Output optical fiber 22 comprises a core 40 that may have an index of refraction substantially similar to that of core 40 of input optical fiber 20. In the embodiment of switch 10 where notch 46 is formed in fiber 20, fiber 22 includes a facet 48 at a bias angle substantially similar to the bias angle of reflective surface 43.

Output optical fiber 24 comprises a contact surface 50 at an angle that is substantially parallel to the bias angle of reflective surface 43. In general, transmissive output member 18 comprises a contact face that is at an angle substantially similar to the angle of a contact surface 50 of an output optical fiber 24. The contact face of transmissive output member 18 is in proximal contact with the contact face of input member 12 when member 18 is placed in the second position.

The index of refraction of core 40 of fiber 24 is substantially similar to that of core 40 of fiber 20. Member 18 has a first position spaced apart from member 12 and a second position in proximal contact with member 12. In conjunction with member 18, fiber 24 has a first position spaced apart from fiber 20 and a second position in proximal contact with fiber 20 to frustrate the total internal reflection of optical signal 30. The term "proximal contact" refers not only to direct contact between optical fibers 24 and 20, but also contemplates any spacing or partial contact between fibers to frustrate the total internal reflection of optical signal 30 to a desired degree. By controllably varying the spacing between fibers 24 and 20 to a desired degree, optical switch 10 may perform a beam splitting or variable attenuation operation such that a desired portion of signal 30 is communicated to fiber 22 and the remaining portion of the signal 30 is communicated to fiber 24. In one embodiment, reflective surface 43 of fiber 20 is substantially parallel to contact surface 50 of fiber 24 when fiber 24 is placed in proximal contact with fiber 20 such that the longitudinal axis of fiber 20 is substantially aligned with the longitudinal axis of fiber 24.

Refractive material 44 comprises air or any other suitable substance that has an index of refraction lower than that of core 40 of optical fiber 20. Optical signal 30 contacts reflective surface 43 at an input angle. If the input angle at which signal 30 contacts reflective surface 43 is equal to or above a critical angle of refraction associated with the interface between core 40 of fiber 20 and refractive material 44, then reflective surface 43 totally internally reflects optical signal 30 at an output angle that is generally determined based upon the input angle of signal 30. Reflective surface 43 of fiber 20 therefore reflects optical signal 30 by total internal reflection (TIR).

In operation of optical switch 10 with transmissive output member 18 spaced apart from input member 12 and, therefore, output fiber 24 spaced apart from input fiber 20, as illustrated in FIG. 2A, fiber 20 communicates optical signal 30 through core 40 as indicated by arrow 52. Total internal reflection at reflective surface 43, the interface between core 40 of fiber 20 and refractive material 44, directs signal 30 through cladding 42 of fiber 20 and into core 40 of output optical fiber 22, as indicated by arrow 54. By placing output optical fiber 22 closer to core 40 of input optical fiber 20 using notch 46 of fiber 20 and facet 48 of fiber 22, switch 10 reduces the amount of cladding 42 through which optical signal 30 propagates from core 40 of fiber 20 to core 40 of fiber 22. In this respect, switch 10 reduces the divergence and, therefore, the insertion loss of optical signal 30. Moreover, switch 10 reduces any "lensing" effects.

Transmissive output member 18 is placed in proximal contact with input member 12 such that contact surface 50 of fiber 24 is placed in proximal contact with reflective surface 43 of fiber 20. In operation of switch 10 with output optical fiber 24 placed in proximal contact with input optical fiber 20, as illustrated in FIG. 2B, fiber 20 communicates optical signal 30 through core 40 as indicated by arrow 52.

Core 40 of fiber 24 having an index of refraction substantially similar to core 40 of fiber 20, frustrates the total internal reflection of optical signal 30 at reflective surface 43. As a result, core 40 of fiber 24 receives optical signal 30 from core 40 of fiber 20. Optical signal 30 propagates through fiber 24 in a direction indicated by arrow 56. Therefore, FIGS. 2A and 2B together illustrate the operation of switch 10 with fiber 24 spaced apart from fiber 20 and with fiber 24 placed in proximal contact with fiber 20, respectively.

By using members 12, 16, and 18 to support an array of waveguides 20, 22, and 24 during the switching operation, switch 10 facilitates the simultaneous switching of multiple channels. In this respect, optical switch 10 comprises an N-channel 1×2 optical switch.

FIG. 3 illustrates one embodiment of an optical switch 100 that includes optical switches 10a, 10b, and 10c arranged in a cascaded architecture to form a 1×8 optical switch. Optical switch 10a includes an input member 12, a reflective output member 16, and a transmissive output member 18. Input member 12 of switch 10a supports an input fiber 20. Reflective output member 16a supports output fiber 22a. Transmissive output member 18a supports output fiber 24a. As switch 10a includes one input channel and two output channels, switch 10a comprises a 1×2 optical switch.

Input member 12b of switch 10b receives output fibers 22a and 24a of switch 10a as input fibers for switch 10b. In this respect, output fibers 22a and 24a comprise intermediate optical fibers for switch 100. Reflective output member 16b supports output fibers 22b and transmissive output member 18b supports output fibers 24b. As switch 10b includes two input channels and four output channels, switch 10b comprises a multi-channel 1×2 optical switch. In this respect, the combination of switches 10a and 10b comprises a 1×4 optical switch.

Input member 12c receives output fibers 22b and 24b as input fibers to switch 10c. In this respect, output fibers 22b and 24b comprise intermediate optical fibers for switch 100. Reflective output member 16c supports four output fibers 22c and transmissive output member 18c supports four output fibers 24c. As switch 10c includes four input channels and eight output channels, switch 10c comprises a multi-channel 1×2, optical switch. The combination of switches 10a, 10b, and 10c therefore comprises a 1×8 optical switch. Although optical switch 100 is illustrated having optical switches 10a, 10b, and 10c arranged to form a 1×8 optical switch, it should be understood that optical switch 100 may include any number and combination of optical switches 10 appropriately arranged to form a 1×N optical switch.

Figures 4, 5:
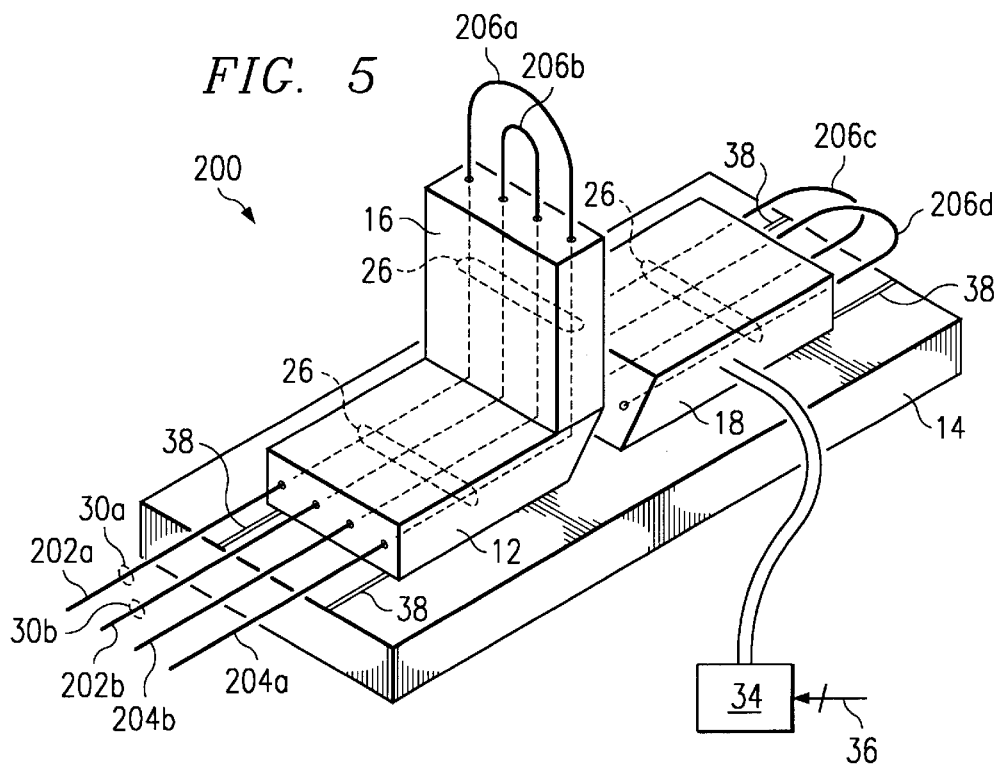
FIG. 4 illustrates one embodiment of a switching table that details the operation of the 1×8 optical switch.
FIG. 5 illustrates a 2×2 embodiment of an optical switch in accordance with the present invention.

The operation of switch 100 illustrated in FIG. 3 is described with reference to the switch states illustrated in switching table 150 of FIG. 4. Referring to FIG. 4, table 150 includes columns 152, 154, and 156 that identify the states of switches 10a, 10b, and 10c, respectively. As illustrated in switching table 150, a particular switch 10 may be in an "OFF" state or an "ON" state. When a switch 10 is in the "OFF" state, the transmissive output member 18 of the switch 10 is in the first position spaced apart from the input member 12 of the switch 10. When a switch 10 is in the "ON" state, the transmissive output member 18 is in the second position in proximal contact with the input member 12 of the switch 10. Table 150 further includes column 158 that identifies the output channel of an optical signal 30 for any given operation of switches 10a, 10b, and 10c, as identified in rows 160–174.

Referring to row 160, switches 10a, 10b, and 10c are each in the "OFF" state. In this regard, transmissive output member 18a is spaced apart from input member 12a. Input fiber 20 communicates optical signal 30. Total internal reflection at reflective surface 43 of input fiber 20 directs signal 30 to output fiber 22a which is the second input channel for input member 12b. With switch 10b in the "OFF" state, transmissive output member 18b is spaced apart from input member 12b. Therefore, total internal reflection at reflective surface 43 of fiber 22a directs signal 30 to the output fiber 22b that enters the fourth input channel of input member 12c. With switch 10c in the "OFF" state, transmissive output member 18c is spaced apart from input member 12c. Therefore, total internal reflection at reflective surface 43 of the appropriate fiber 22b directs signal 30 to the output fiber 22c that is the eighth output channel of switch 10c.

Referring to row 162, switches 10a and 10b are in the "OFF" state and 10c is in the "ON" state. In this regard, transmissive output member 18a is spaced apart from input member 12a. Input fiber 20 communicates optical signal 30. Total internal reflection at reflective surface 43 of input fiber 20 directs signal 30 to output fiber 22a which is the second input channel for input member 12b. With switch 10b in the "OFF" state, transmissive output member 18b is spaced apart from input member 12b. Therefore, total internal reflection at reflective surface 43 of fiber 22a directs signal 30 to the output fiber 22b that enters the fourth input channel of input member 12c. With switch 10c in the "ON" state, transmissive output member 18c is placed in proximal contact with input member 12c. Therefore, an appropriate output fiber 24c frustrates the total internal reflection of optical signal 30 at reflective surface 43 of the fiber 22b. As a result, the output fiber 24c that is the fourth output channel of switch 10c receives optical signal 30.

Referring to row 164, switches 10a and 10c are each in the "OFF" state and switch 10b is in the "ON" state. In this regard, transmissive output member 18a is spaced apart from input member 12a. Input fiber 20 communicates optical signal 30. Total internal reflection at reflective surface 43 of input fiber 20 directs signal 30 to output fiber 22a which is the second input channel for input member 12b. With switch 10b in the "ON" state, transmissive output member 18b is placed in proximal contact with input member 12b. Therefore, an appropriate output fiber 24b frustrates the total internal reflection of optical signal 30 at reflective surface 43 of fiber 22a. As a result, fiber 24b receives optical signal 30 and enters the second channel of input member 12c. With switch 10c in the "OFF" state, transmissive output member 18c is spaced apart from input member 12c. Therefore, total internal reflection at reflective surface 43 of the appropriate fiber 24b directs signal 30 to the output fiber 22c that is the sixth output channel of switch 10c.

Referring to row 166, switch 10a is in the "OFF" state and switches 10b and 10c are each in the "ON" state. In this regard, transmissive output member 18a is spaced apart from input member 12a. Input fiber 20 communicates optical signal 30. Total internal reflection at reflective surface 43 of input fiber 20 directs signal 30 to output fiber 22a which is the second input channel for input member 12b. With switch 10b in the "ON" state, transmissive output member 18b is placed in proximal contact with input member 12b. Therefore, an appropriate output fiber 24b frustrates the total internal reflection of optical signal 30 at reflective surface 43 of fiber 22a. As a result, fiber 24b receives optical signal 30 and enters the second channel of input member 12c. With switch 10c in the "ON" state, transmissive output member 18c is placed in proximal contact with input member 12c. Therefore, an appropriate output fiber 24c frustrates the total internal reflection of optical signal 30 at reflective surface 43 of the fiber 24b. As a result, the output fiber 24c that is the second output channel of switch 10c receives optical signal 30.

Referring to row 168, switch 10a is in the "ON" state and switches 10b and 10c are each in the "OFF" state. In this regard, transmissive output member 18a is placed in proximal contact with input member 12a. Fiber 20 communicates optical signal 30. Fiber 24a frustrates the total internal reflection of optical signal 30 at reflective surface 43 of fiber 20. As a result, fiber 24a receives optical signal 30 and enters the first channel of input member 12b. With switch 10b in the "OFF" state, transmissive output member 18b is spaced apart from input member 12b. Therefore, total internal reflection at reflective surface 43 of fiber 24a directs signal 30 to the output fiber 22b that enters the third input channel of input member 12c. With switch 10c in the "OFF" state, transmissive output member 18c is spaced apart from input member 12c. Therefore, total internal reflection at reflective surface 43 of the appropriate fiber 22b directs signal 30 to the output fiber 22c that is the seventh output channel of switch 10c.

Referring to row 170, switches 10a and 10c are in the "ON" state and switch 10b is in the "OFF" state. In this regard, transmissive output member 18a is placed in proximal contact with input member 12a. Fiber 20 communicates optical signal 30. Fiber 24a frustrates the total internal reflection of optical signal 30 at reflective surface 43 of fiber 20. As a result, fiber 24a receives optical signal 30 and enters the first channel of input member 12b. With switch 10b in the "OFF" state, transmissive output member 18b is spaced apart from input member 12b. Therefore, total internal reflection at reflective surface 43 of fiber 24a directs signal 30 to the output fiber 22b that enters the third input channel of input member 12c. With switch 10c in the "ON" state, transmissive output member 18c is placed in proximal contact with input member 12c. Therefore, an appropriate output fiber 24c frustrates the total internal reflection of optical signal 30 at reflective surface 43 of the fiber 22b. As a result, the output fiber 24c that is the third output channel of switch 10c receives optical signal 30.

Referring to row 172, switches 10a and 10b are in the "ON" state and switch 10c is in the "OFF" state. In this regard, transmissive output member 18a is placed in proximal contact with input member 12a. Fiber 20 communicates optical signal 30. Fiber 24a frustrates the total internal reflection of optical signal 30 at reflective surface 43 of fiber 20. As a result, fiber 24a receives optical signal 30 and enters the first channel of input member 12b. With switch 10b in the "ON" state, transmissive output member 18b is placed in proximal contact with input member 12b. Therefore, an appropriate output fiber 24b frustrates the total internal reflection of optical signal 30 at reflective surface 43 of fiber 24a. As a result, fiber 24b receives optical signal 30 and enters the first channel of input member 12c. With switch 10c in the "OFF" state, transmissive output member 18c is spaced apart from input member 12c. Therefore, total internal reflection at reflective surface 43 of the appropriate fiber 24b directs signal 30 to the output fiber 22c that is the fifth output channel of switch 10c.

Referring to row 174, switches 10a, 10b, and 10c are each in the "ON" state. In this regard, transmissive output member 18a is placed in proximal contact with input member 12a. Fiber 20 communicates optical signal 30. Fiber 24a frustrates the total internal reflection of optical signal 30 at reflective surface 43 of fiber 20. As a result, fiber 24a receives optical signal 30 and enters the first channel of input member 12b. With switch 10b in the "ON" state, transmissive output member 18b is placed in proximal contact with input member 12b. Therefore, an appropriate output fiber 24b frustrates the total internal reflection of optical signal 30 at reflective surface 43 of fiber 24a. As a result, fiber 24b receives optical signal 30 and enters the first channel of input member 12c. With switch 10c in the "ON" state, transmissive output member 18c is placed in proximal contact with input member 12c. Therefore, an appropriate output fiber 24c frustrates the total internal reflection of optical signal 30 at reflective surface 43 of the fiber 24b. As a result, the output fiber 24c that is the first output channel of switch 10c receives optical signal 30.

FIG. 5 illustrates one embodiment of a 2×2 optical switch 200 that includes input member 12 coupled to baseplate 14, reflective output member 16 coupled to input member 12, and transmissive output member 18 having a first position spaced apart from input member 12 and a second position in proximal contact with input member 12. Input member 12 supports input waveguides 202a and 202b as well as output waveguides 204a and 204b. Reflective output member 16 supports a first return loop waveguide 206a that couples waveguide 202a to waveguide 204a, and a second return loop waveguide 206b that couples waveguide 202b to waveguide 204b. Transmissive output member 18 supports a third return loop waveguide 206c that couples waveguide 202a to waveguide 204b, and a fourth return loop waveguide 206d that couples waveguide 202b to waveguide 204a.

Waveguides 202a–b, 204a–b, and 206a–d each comprise an optical waveguide formed by an arrangement of suitable optically transmissive material that communicates optical signal 30 as a guided wave of energy. In one embodiment of switch 200, waveguides 202a–b, 204a–b, and 206a–d each comprise optical fibers (referred to generally as fibers 202a–b, 204a–b, and 206a–d). In general, fibers 202a–b, 204a–b, and 206a–d each include a core 40 and a cladding 42, as described above with regard to fibers 20–24. In addition, fibers 202a–b and 204a–b include a reflective surface 43 and fibers 206a–d include a contact surface 50, as described above with regard to fibers 20–24. In another embodiment of switch 200, waveguides 202a–b, 204a–b, and 206a–d each comprise a planar waveguide formed in an appropriate refractive material, as described above with regard to waveguides 20–24. In yet another embodiment, waveguides 202a–b, 204a–b, and 206a–d each comprise an optical fiber and/or a planar waveguide, as described above with regard to waveguides 20–24, to form a hybrid optical fiber/planar waveguide optical switch 200.

In operation, each of input fibers 202a and 202b communicates a corresponding optical signal 30 to a selected one of output optical fibers 204a or 204b based upon the position of transmissive output member 18. For example, optical switch 200 communicates optical signal 30a from input optical fiber 202a to output optical fiber 204a, and input optical signal 30b from input optical fiber 202b to output optical fiber 204b, when transmissive output member 18 is spaced apart from input member 12, as described in greater detail with reference to FIG. 6A. Optical switch 200 communicates optical signal 30a from input optical fiber 202a to output optical fiber 204b, and optical signal 30b from input optical fiber 202b to output optical fiber 204a when transmissive output member 18 is placed in proximal contact with input member 12, as described in greater detail with reference to FIG. 6B.

Figure 6A:
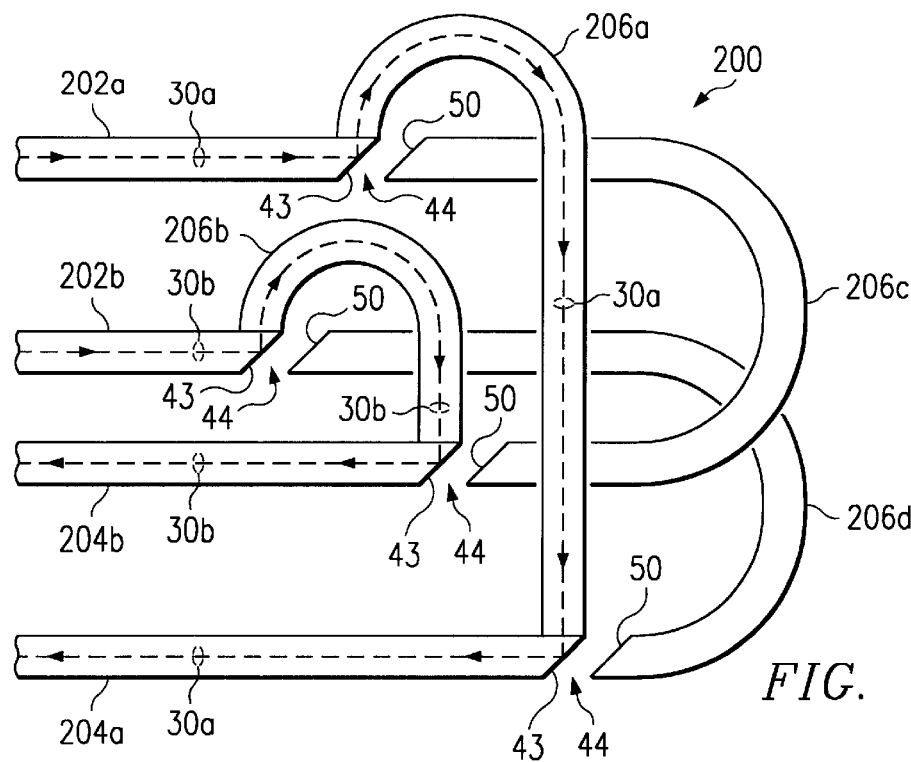
FIG. 6A illustrates the 2×2 optical switch operating in an unswitched mode.

In operation of optical switch 200 with return loop fibers 206c and 206d spaced apart from input optical fibers 202a and 202*b*, as illustrated in FIG. 6A, fibers 202*a* and 202*b* communicate optical signals 30*a* and 30*b*, respectively. Total internal reflection at reflective surface 43 of input fiber 202*a* directs optical signal 30*a* to output optical fiber 204*a* via return loop fiber 206*a*. Total internal reflection at reflective surface 43 of input optical fiber 202*b* directs optical signal 30*b* to output optical fiber 204*b* via return loop fiber 206*b*.

Figure 6B:
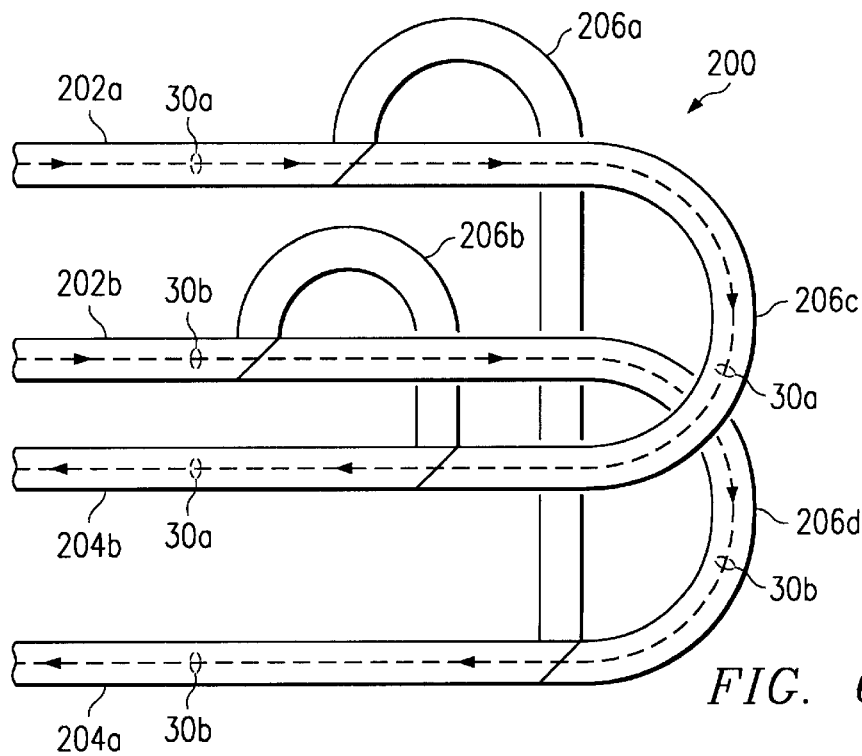
FIG. 6B illustrates the 2×2 optical switch operating in a switched mode.

In operation of optical switch 200 with return loop fibers 206*c* and 206*d* in proximal contact with input fibers 202*a* and 202*b*, as illustrated in FIG. 6B, fibers 202*a* and 202*b* communicate optical signals 30*a* and 30*b*, respectively. Return loop fiber 206*c* frustrates the total internal reflection of optical signal 30*a* at reflective surface 43 of input optical fiber 202*a*. As a result, return loop fiber 206*c* receives optical signal 30*a* and communicates signal 30*a* to output optical fiber 204*b*. Return loop fiber 206*d* frustrates the total internal reflection of optical signal 30*b* at reflective surface 43 of input fiber 202*b*. As a result, return loop fiber 206*d* receives optical signal 30*b* and communicates signal 30*b* to output optical fiber 204*a*. Therefore, FIGS. 6A and 6B together illustrate the operation of switch 200 with fibers 206*c* and 206*d* spaced apart from fibers 202*a* and 202*b*, respectively, and with fibers 206*c* and 206*d* placed in proximal contact with fibers 202*a* and 202*b*, respectively.

Figure 7:
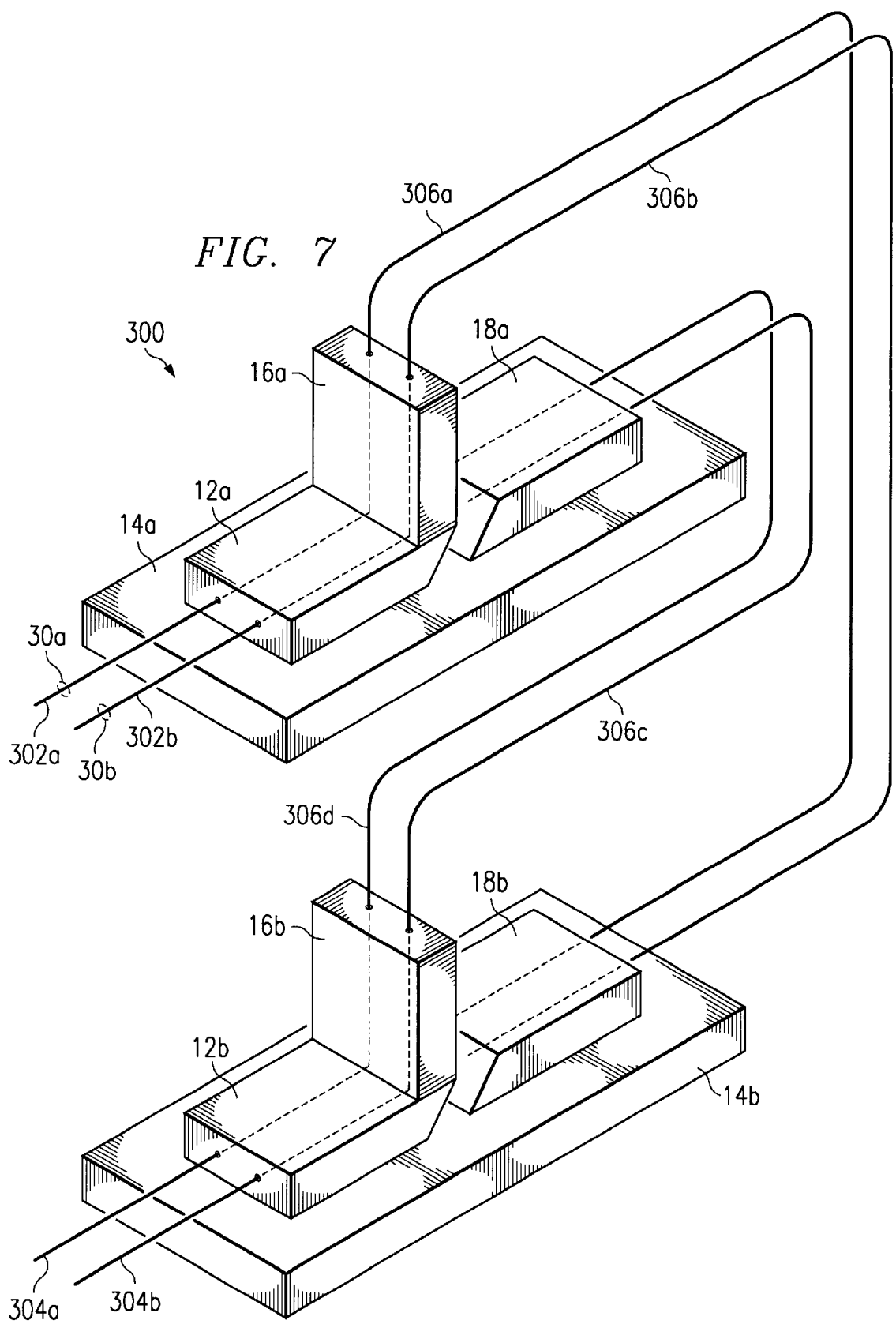
FIG. 7 illustrates another 2×2 embodiment of an optical switch in accordance with the present invention.

FIG. 7 illustrates one embodiment of a 2×2 optical switch 300 that includes first input member 12*a* coupled to baseplate 14*a*, first reflective output member 16*a* coupled to input member 12*a*, and first transmissive output member 18*a* having a first position spaced apart from input member 12*a* and a second position in proximal contact with input member 12*a*. First input member 12*a* supports input waveguides 302*a* and 302*b*. First reflective output member 16*a* supports a first intermediate waveguide 306*a*, and a second intermediate waveguide 306*b*, also referred to as return-loop waveguides 306*a* and 306*b*. Transmissive output member 18*a* supports a third intermediate waveguide 306*c*, and a fourth intermediate waveguide 306*d*, also referred to as return-loop waveguides 306*c* and 306*d*.

Optical switch 300 further includes a second input member 12*b* coupled to a baseplate 14*b*, a second reflective output member 16*b* coupled to input member 12*b*, and a second transmissive output member 18*b* having a first position spaced apart from input member 12 and a second position placed in proximal contact with input member 12*b*. Input member 12*b* supports output waveguides 304*a* and 304*b*. Reflective output member 16*b* supports intermediate waveguides 306*c* and 306*d* received from transmissive output member 18*a*. Transmissive output member 18*b* supports intermediate waveguides 306*a* and 306*b* received from reflective output member 16*a*.

Waveguides 302*a–b*, 304*a–b*, and 306*a–d* each comprise an optical waveguide formed by an arrangement of suitable optically transmissive material that communicates optical signal 30 as a guided wave of energy. In one embodiment of switch 300, waveguides 302*a–b*, 304*a–b*, and 306*a–d* each comprise optical fibers (referred to generally as fibers 302*a–b*, 304*a–b*, and 306*a–d*, respectively). In general, fibers 302*a–b*, 304*a–b*, and 306*a–d* each include a core 40 and a cladding 42, as described above with regard to fibers 20–24. In addition, fibers 302*a–b* and 304*a–b* include a reflective surface 43 and fibers 306*a–d* include a contact surface 50, as described above with regard to fibers 20–24. In another embodiment of switch 300, waveguides 302*a–b*, 304*a–b*, and 306*a–d* each comprise a planar waveguide formed in an appropriate refractive material, as described above with regard to waveguides 20–24. In yet another embodiment, waveguides 302*a–b*, 304*a–b*, and 306*a–d* each comprise an optical fiber and/or a planar waveguide, as described above with regard to waveguides 20–24, to form a hybrid optical fiber/planar waveguide optical switch 300.

In operation, each of input fibers 302*a* and 302*b* communicates a corresponding optical signal 30 to a selected one of output optical fibers 304*a* or 304*b* based upon the position of transmissive output members 18*a* and 18*b*. For example, optical switch 300 communicates optical signal 30*a* from input optical fiber 302*a* to output optical fiber 304*a*, and input optical signal 30*b* from input optical fiber 302*b* to output optical fiber 304*b*, when transmissive output member 18*a* is spaced apart from input member 12*a* and transmissive output member 18*b* is placed in proximal contact with input member 12*b*, as described in greater detail with reference to FIG. 8A. Optical switch 300 communicates optical signal 30*a* from input optical fiber 302*a* to output fiber 304*b*, and optical signal 30*b* from input optical fiber 302*b* to output fiber 304*a* when transmissive output member 18*a* is placed in proximal contact with input member 12*a* and transmissive output member 18*b* is spaced apart from input member 12*b*, as described in greater detail with reference to FIG. 8B.

Figure 8A:
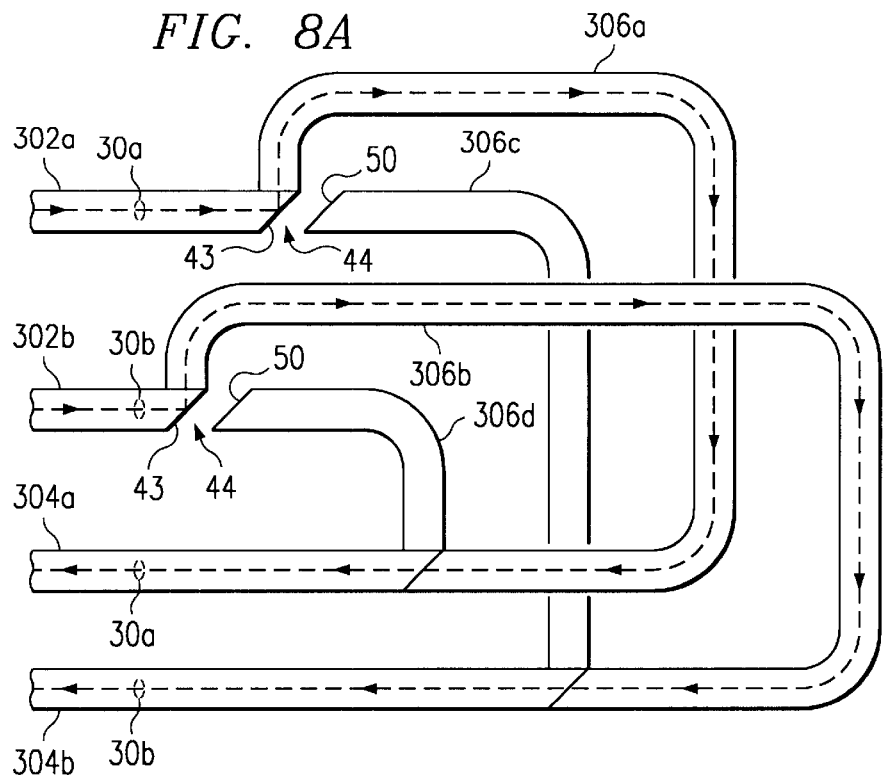
FIG. 8A illustrates the 2×2 optical switch operating in an unswitched mode.

In operation of optical switch 300 with intermediate fibers 306*c* and 306*d* spaced apart from input optical fibers 302*a* and 302*b*, and intermediate fibers 306*a* and 306*b* placed in proximal contact with output fibers 304*a* and 304*b*, respectively, as illustrated in FIG. 8A, fibers 302*a* and 302*b* communicate optical signals 30*a* and 30*b*, respectively. Total internal reflection at reflective surface 43 of input fiber 302*a* directs optical signal 30*a* to output optical fiber 304*a* via intermediate fiber 306*a*. Total internal reflection at reflective surface 43 of input optical fiber 302*b* directs optical signal 30*b* to output optical fiber 304*b* via intermediate fiber 306*b*.

Figure 8B:
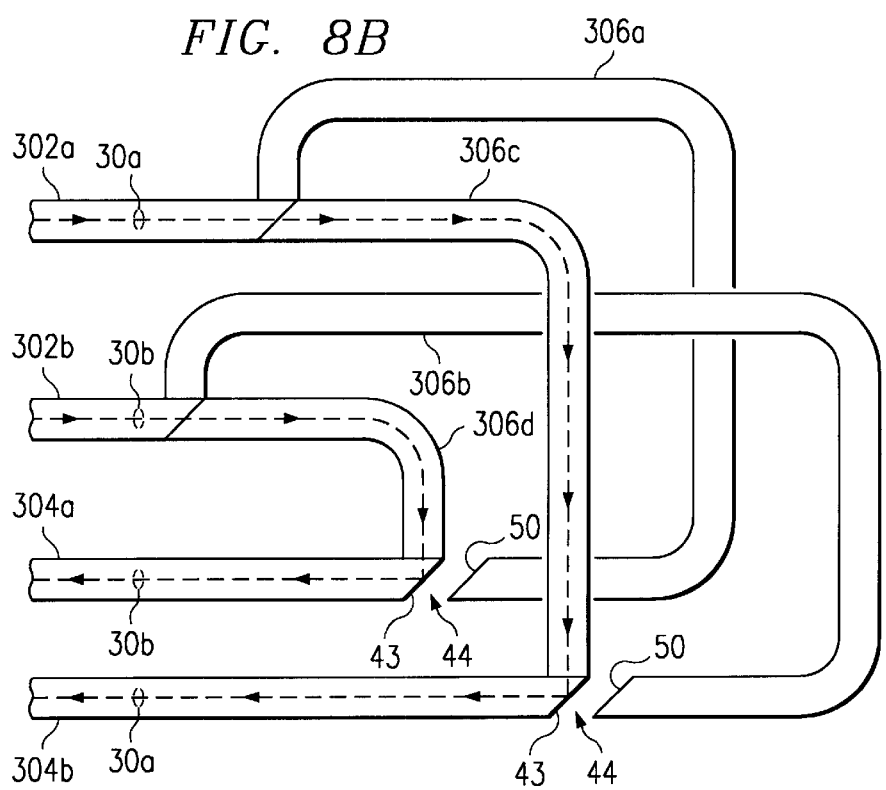
FIG. 8B illustrates the 2×2 optical switch operating in a switched mode.

In operation of optical switch 300 with intermediate fibers 306*c* and 306*d* in proximal contact with input fibers 302*a* and 302*b*, and intermediate fibers 306*a* and 306*b* spaced apart from fibers 304*a* and 304*b*, as illustrated in FIG. 8B, fibers 302*a* and 302*b* communicate optical signals 30*a* and 30*b*, respectively. Intermediate fiber 306*c* frustrates the total internal reflection of optical signal 30*a* at reflective surface 43 of input optical fiber 302*a*. As a result, intermediate fiber 306*c* receives optical signal 30*a* and communicates signal 30*a* to output optical fiber 304*b* due to total internal reflection at reflective surface 43 of fiber 304*b*. Intermediate fiber 306*d* frustrates the total internal reflection of optical signal 30*b* at reflective surface 43 of input fiber 302*b*. As a result, intermediate fiber 306*d* receives optical signal 30*b* and communicates signal 30*b* to output optical fiber 304*a* due to total internal reflection at reflective surface 43 of fiber 304*a*. Therefore, FIGS. 8A and 8B together illustrate the operation of switch 300.

FIG. 9 illustrates one embodiment of a 2×2 optical switch 400 that includes first input member 12*a* coupled to first reflective output member 16*a*, and second input member 12*b* coupled to second reflective output member 16*b*. Second reflective output member 16*b* has a first position spaced apart from first input member 12*a* and a second position in proximal contact with first input member 12*a*. First input member 12*a* supports input waveguide 402*a*. First reflective output member 16*a* supports first output waveguide 404*a*. Second input member 12*b* supports second input waveguide 402*b*. Second reflective output member 16*b* supports second output waveguide 404*b*.

Waveguides 402*a–b* and 404*a–b* each comprise an optical waveguide formed by an arrangement of suitable optically transmissive material that communicates optical signal 30 as a guided wave of energy. In one embodiment of switch 400, waveguides 402a–b and 404a–b each comprise optical fibers (referred to generally as fibers 402a–b and 404a–b). In general, fibers 402a–b and 404a–b each include a core 40 and a cladding 42, as described above with regard to fibers 20–24. In addition, fiber 402a includes a reflective surface 43 and fiber 404b includes a contact surface 50, as described above with regard to fibers 20–24. In another embodiment of switch 400, waveguides 402a–b and 404a–b each comprise a planar waveguide formed in an appropriate refractive material, as described above with regard to waveguides 20–24. In yet another embodiment, waveguides 402a–b and 404a–b each comprise an optical fiber and/or a planar waveguide, as described above with regard to waveguides 20–24, to form a hybrid optical fiber/planar waveguide optical switch 400.

In operation, each of input fibers 402a and 402b communicates a corresponding optical signal 30 to a selected one of output optical fibers 404a or 404b based upon the position of second reflective output member 16b. For example, optical switch 400 communicates optical signal 30a from input optical fiber 402a to output optical fiber 404a, and input optical signal 30b from input optical fiber 402b to output optical fiber 404b, when second reflective output member 16b is spaced apart from first input member 12a, as described in greater detail with reference to FIG. 10A. Optical switch 400 communicates optical signal 30a from input optical fiber 402a to output optical fiber 404b, and optical signal 30b from input optical fiber 402b to output optical fiber 404a when second reflective output member 16b is placed in proximal contact with first input member 12a, as described in greater detail with reference to FIG. 10B.

In operation of optical switch 400 with output fiber 404b spaced apart from input fiber 402a, as illustrated in FIG. 10A, fibers 402a and 402b communicate optical signals 30a and 30b, respectively. Total internal reflection at reflective surface 43 of input fiber 402a directs optical signal 30a to output fiber 404a. Total internal reflection at contact surface 50 of output fiber 404b directs optical signal 30b to fiber 404b.

In operation of optical switch 400 with fiber 404b placed in proximal contact with fiber 402a, as illustrated in FIG. 10B, fibers 402a and 402b communicate optical signals 30a and 30b, respectively. Fiber 404b frustrates the total internal reflection of optical signal 30a at reflective surface 43 of input fiber 402a. As a result, output fiber 404b receives optical signal 30a. Input fiber 402a frustrates the total internal reflection of optical signal 30b at contact surface 50 of output fiber 404b. As a result, output fiber 404a receives optical signal 30b. Therefore, FIGS. 10A and 10B together illustrate the operation of switch 400.

Figure 11:
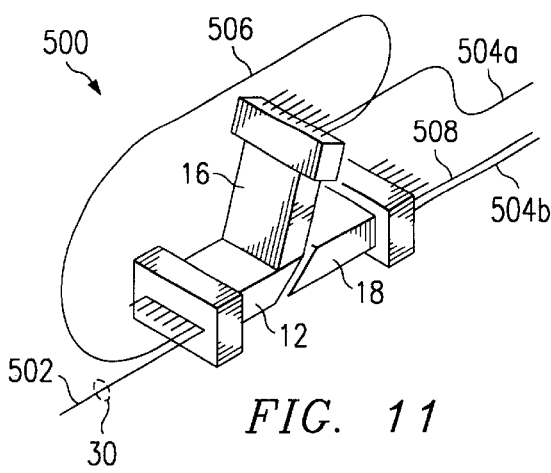
FIG. 11 illustrates a 1×2 embodiment of an optical switch using a returned loop waveguide.

FIG. 11 illustrates one embodiment of a 1×2 optical switch 500 that includes input member 12, reflective output member 16 coupled to input member 12, and transmissive output member 18 having a first position spaced apart from input member 12 and a second position in proximal contact with input member 12. Input member 12 supports input waveguide 502. Reflective output member 16 supports first output waveguide 504a and a return loop waveguide 506. Transmissive output member 18 supports a second output waveguide 504b, and a switching waveguide 508.

Waveguides 502, 504a–b, 506, and 508 each comprise an optical waveguide formed by an arrangement of suitable optically transmissive material that communicates optical signal 30 as a guided wave of energy. In one embodiment of switch 500, waveguides 502, 504a–b, 506, and 508 each comprise optical fibers (referred to generally as fibers 502, 504a–b, 506 and 508, respectively). In general, fibers 502, 504a–b, 506, and 508 each include a core 40 and a cladding 42, as described above with regard to fibers 20–24. In addition, fibers 502 and 506 include a reflective surface 43 and fibers 504b and 508 include a contact surface 50, as described above with regard to fibers 20–24. In another embodiment, fiber 506 includes a reflective surface 43 that operates in conjunction with contact surface 50 of fiber 504b, and fiber 504a includes a reflective surface 43 that operates in conjunction with fiber 508. In another embodiment of switch 500, waveguides 502, 504a–b, 506 and 508 each comprise a planar waveguide formed in an appropriate refractive material, as described above with regard to waveguides 20–24. In yet another embodiment, waveguides 502, 504a–b, and 506, and 508 each comprise an optical fiber and/or a planar waveguide, as described above with regard to waveguides 20–24, to form a hybrid optical fiber/planar waveguide optical switch 500.

In operation, input fiber 502 communicates an optical signal 30 to a selected one of output optical fibers 504a or 504b based upon the position of transmissive output number 18a. A technical advantage provided by the present invention is that the optical switch 500 reduces the effects of cross-talk signals. For example, while transmissive output member 18 is placed in proximal contact with input member 12, the contact surface 50 of output fiber 504b is placed in proximal contact with reflective surface 43 of input fiber 502 to frustrate the total internal reflection of optical signal 30. A small portion of optical signal 30 may be reflected, however, at reflective surface 43 and processed as though optical switch 500 is operating in the unswitched state. This undesired result is one source of a cross-talk signal in the system. Optical switch 500 uses double-pass propagation to process any such cross-talk signals so that a large portion of the cross-talk signals is not received by an optical component, such as output fiber 504a, of optical switch 500. The negative effects of a cross-talk signal are thereby reduced.

Figure 12A:
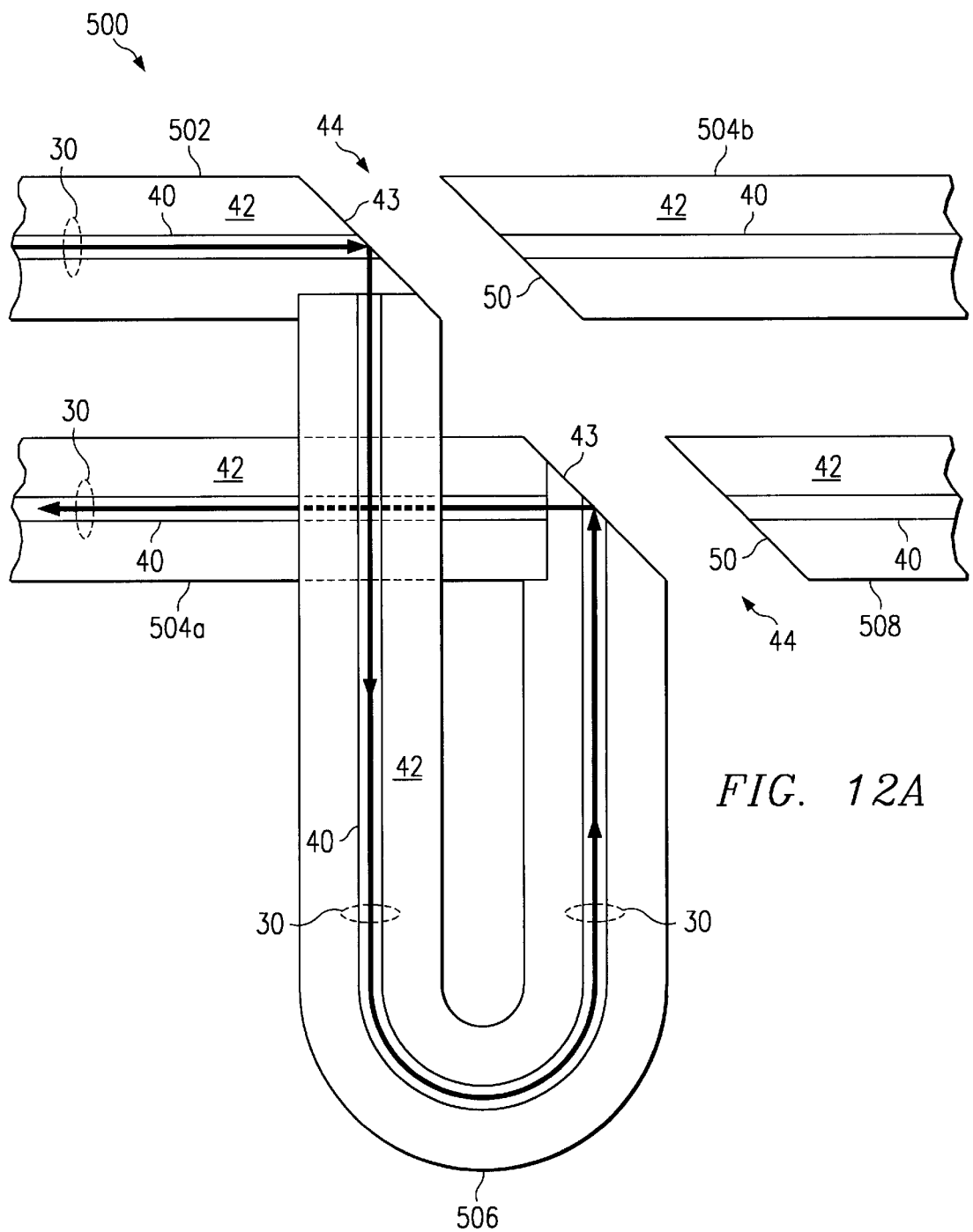
FIG. 12A illustrates the 1×2 optical switch using a return loop waveguide operating in an unswitched mode.

FIG. 12A illustrates optical switch 500 with output optical fiber 504b and switching fiber 508 spaced apart from input fiber 502 and output fiber 504a, respectively. In operation, input fiber 502 communicates optical signal 30. Total internal reflection at reflective surface 43 of input fiber 502 directs optical signal 30 to return loop fiber 506. Total internal reflection at reflective surface 43 of return loop fiber 506 directs optical signal 30 to output fiber 504a.

Figure 12B:
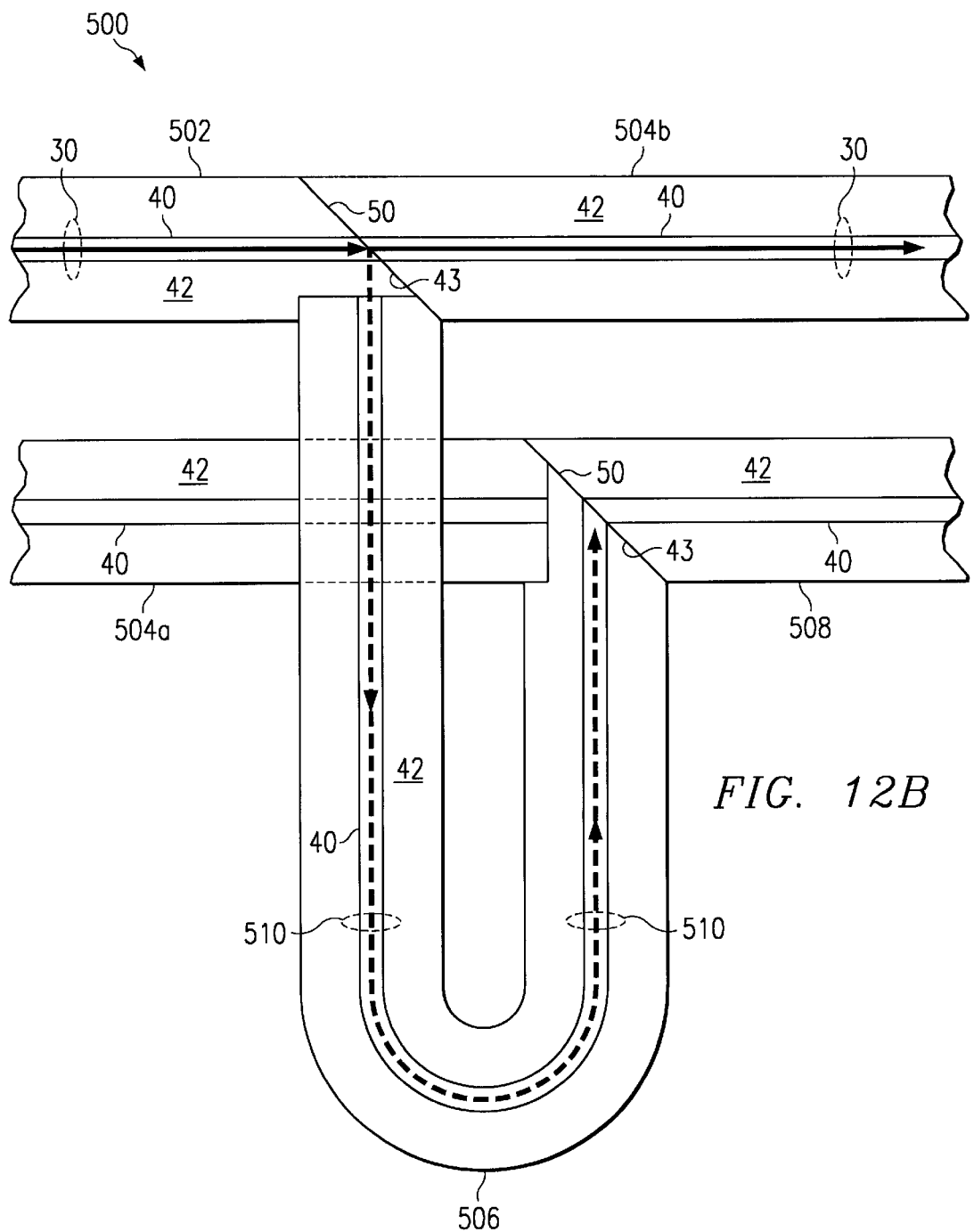
FIG. 12B illustrates the 1×2 optical switch using a return loop waveguide operating in switched mode.

FIG. 12B illustrates optical switch 500 with output fiber 504b and switching fiber 508 placed in proximal contract with input fiber 502 and output fiber 504a, respectively. In operation, input fiber 502 communicates optical signal 30. Contact surface 50 of output optical fiber 504b frustrates the total internal reflection of optical signal 30 at reflective surface 43 of input fiber 502. As a result, output optical fiber 504b receives almost all of signal 30. Ideally, contact surface 50 of fiber 504b frustrates the total internal refection of the entire signal 30 at reflective surface 43 such that signal 30 is communicated into fiber 504b, as illustrated using a solid line for signal 30. Reflection of a small, residual portion of signal 30 at the interface between surfaces 43 and 50 may result in a cross-talk signal 510, as illustrated using a dashed line. A technical advantage provided by switch 500 illustrated in FIGS. 11, 12A and 12B is that switch 500 minimizes the amount of cross-talk signal 510 that is received by fiber 504a, or any other optical component of switch 500.

Referring to FIG. 12B, return loop optical fiber 506 propagates cross-talk signal 510 toward a reflective surface 43. Switching fiber 508 frustrates the total internal reflection of cross-talk signal 510 at reflective surface 43 of return loop fiber 506. This technique may be referred to as double-pass propagation because cross-talk signal 510 is subjected to a second FTIR interface. Only a negligible residual portion of cross-talk signal 510, if any, is directed by total internal reflection into fiber 504a. Almost all of cross-talk signal 510 is directed away from any of the optical components of switch 500. Therefore, switch 500 reduces the effects of cross-talk signal 510 and results in what is generally referred to as a cross-talk improvement.

Figure 13:
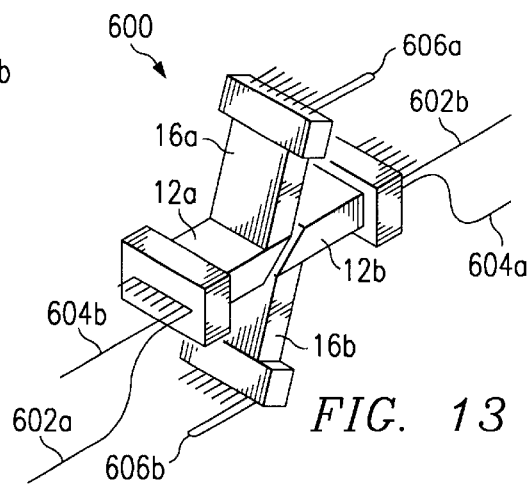
FIG. 13 illustrates a 2×2 embodiment of an optical switch using a return loop waveguide.

FIG. 13 illustrates one embodiment of a 2×2 optical switch 600 that includes a first input member 12a coupled to a first reflective output member 16a, and a second input member 12b coupled to a second reflective output member 16b. Second input member 12b has a first position spaced apart from the first input member 12a and a second position in proximal contact with first input member 12a. First input member 12a supports first input waveguide 602a and second output waveguide 604b. Second input member 12b supports second input waveguide 602b and first output waveguide 604a. First reflective output member 16a supports first return loop waveguide 606a. Second reflective output member 16b supports second return loop waveguide 606b.

Waveguides 602a–b, 604a–b and 606a–b each comprise an optical waveguide formed by an arrangement of suitable optically transmissive material that communicates optical signal 30 as a guided wave of energy. In one embodiment of switch 600, waveguides 602a–b, 604a–b, and 606a–b each comprise optical fibers (referred to generally as fibers 602a–b, 604a–b, and 606a–b). In general, fibers 602a–b, 604a–b, and 606a–b each includes a core 40 and a cladding 42, as described about with regard to fibers 20–24. In addition, fibers 602a and 604b include a reflective surface 43 and fibers 602b and 604a include a contact surface 50, as described above with regard to fibers 20–24. In another embodiment of switch 600, waveguides 602a–b, 604a–b, and 606a–b each comprise a planar waveguide formed in an appropriate refractive material, as described above with regard to waveguides 20–24. In yet another embodiment, waveguides 602a–b, 604a–b, and 606a–b each comprise an optical fiber and/or a planar waveguide, as described above with regard to waveguides 20–24, to form a hybrid optical fiber/planar waveguide optical switch 600.

In operation, each of input fibers 602a and 602b communicates a corresponding optical signal 30 to a selected one of output optical fibers 604a or 604b based upon the position of second input member 12b. For example, optical switch 600 communicates optical. signal 30a from input optical fiber 602a to output optical fiber 604b, and input optical signal 30b from input optical fiber 602b to output optical fiber 604a, when second input member 12b is spaced apart from first input member 12a, as described in greater detail with reference to FIG. 14A. Optical switch 600 communicates optical signal 30a from input optical fiber 602a to output optical fiber 604a, and optical signal 30b from input optical fiber 602b to output optical fiber 604b when second input member 12b in placed in proximal contact with first input member 12a, as described in greater detail with reference to FIG. 14B.

Figure 14A:
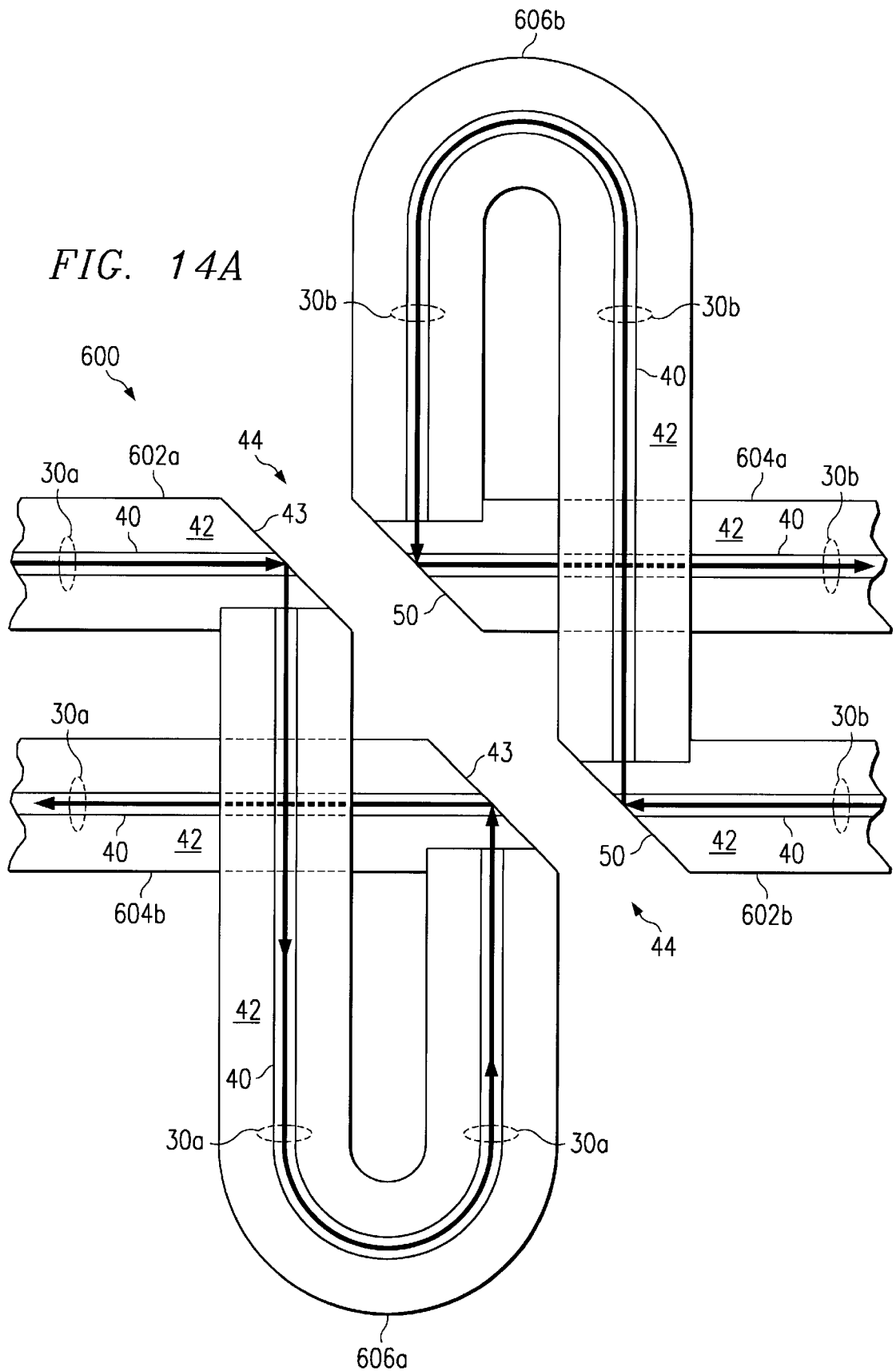
FIG. 14A illustrates the 2×2 optical switch using a return loop waveguide operating in an unswitched mode.

In operation of optical switch 600 with output fiber 604a and input fiber 602b in proximal contact with input fiber 602a and output fiber 604b, respectively, as illustrated in FIG. 14A, fibers 602a and 602b communicate optical signals 30a and 30b, respectively. Total internal reflection at reflective surface 43 of input fiber 602a directs optical signal 30a to return loop fiber 606a. Total internal reflection at reflective surface 43 of fiber 604b directs signal 30a into output fiber 604b. Input fiber 602b communicates optical signal 30b. Total internal reflection at contact surface 50 of fiber 602b directs signal 30b to return loop optical fiber 606b. Return loop fiber 606b propagates optical signal 30b toward contact surface 50 of input fiber 604a. Total internal reflection of signal 30b at contact surface 50 of fiber 604a directs signal 30b into fiber 604a. In this respect, input fiber 602 communicates optical signal 30a to output fiber 604b. Furthermore, input fiber 602b communicates optical signal 30b to output fiber 604a.

In operation of switch 600 with fibers 604a and 602b in proximal contact with fibers 602a and 604b, respectively, as illustrated in FIG. 14B, fibers 602a and 602b communicate optical signal 30a and 30b, respectively. Contact surface 50 of fiber 604a frustrates the total internal reflection of optical signal 30a at reflective surface 43 of input fiber 602a. As a result, fiber 604a receives almost all of signal 30a. Similarly, fiber 604b receives almost all of optical signal 30b as a result of frustrated total internal reflection of signal 30b at contact surface 50 of fiber 602b. Signals 30a and 30b are indicated using solid lines.

As described above with reference to cross-talk signal 510 in FIGS. 12A and 12B, reflection of a small, residual portion of signals 30a and 30b at the interfaces between fibers 604a and 602a, and fibers 604b and 602b, respectively, results in cross-talk signals 610 and 612. Cross-talk signals 610 and 612 are indicated using dashed lines. A particular advantage provided by switch 600 illustrated in FIGS. 14A and 14B is that switch 600 further processes cross-talk signals 610 and 612 so that a large portion of cross-talk signals 610 and 612 are not received by output fibers 604a and 604b.

Referring to FIG. 14B, return loop fiber 606a propagates signal 610 toward reflective surface 43 of fiber 604b. Contact surface 50 of fiber 602b frustrates the total internal reflection of signal 610 such that signal 610 propagates to return loop fiber 606b. Similarly, return loop fiber 606b propagates signal 612 toward contact surface 50 of fiber 604a. Reflective surface 43 of fiber 602a frustrates the total internal reflection of signal 612 such that signal 612 propagates to return loop fiber 606a. Only a negligible residual portion of signals 610 and 612, if any, is directed by reflection into fibers 604a and 604b. In this respect, return loop fibers 606a and 606b propagate cross-talk signals 610 and 612 until they dissipate. Therefore, switch 600 reduces the effects of cross-talk signals 610 and 612.

Figure 15:
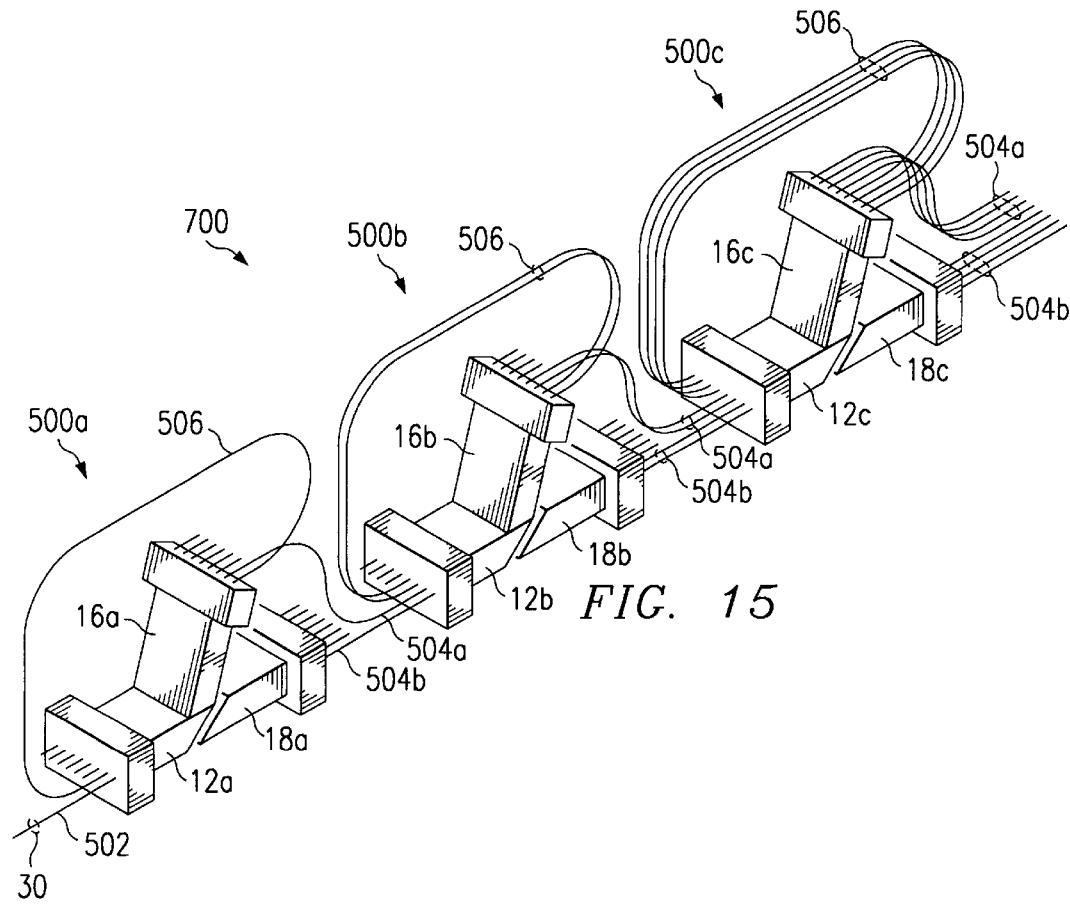
FIG. 15 illustrates a 1×8 embodiment of an optical switch using return loop waveguides.

FIG. 15 illustrates a 1×8 embodiment of an optical switch 700 that uses return loop waveguides to achieve a cross-talk improvement using double-pass propagation. Optical switch 700 includes optical switches 500a, 500b, and 500c arranged in a cascaded architecture. Each individual optical switch 500a–c uses one or more return loop waveguides 506, as described in detail with regard to FIGS. 11, 12A and 12B, to achieve a cross-talk improvement using double-pass propagation. Although optical switch 500 is described as a single channel 1×2 optical switch with reference to FIGS. 11, 12A, and 12B, it should be understood that switches 500b and 500c of switch 700 comprise multi-channel 1×2 optical switches.

The operation of switch 700 follows the operation of switch 100 described with reference to FIGS. 3 and 4. In particular, if switches 500a, 500b, and 500c operate in the appropriate switched or unswitched states described in columns 152, 154, and 156, respectively, of table 150 illustrated in FIG. 4, then the appropriate output channel among output channels 504a and 504b, receives optical signal 30, as described in column 158 of table 150. A technical advantage of the present invention is that optical switch 700 reduces the effects of any cross-talk signals generated by undesired reflections in switches 500a–c, as described above with regard to FIG. 11 and FIGS. 12A–12B.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. An optical switch, comprising:
an input member operable to support a plurality of input waveguides, each input waveguide having a reflective surface and operable to receive a corresponding optical signal;
a reflective output member coupled to the input member and operable to support a plurality of first output waveguides, each first output waveguide coupled to a corresponding input waveguide; and
a transmissive output member operable to support a plurality of second output waveguides, the transmissive output member having a first position spaced apart from the input member such that the reflective surface of each input waveguide totally internally reflects a corresponding optical signal to a corresponding one of the first output waveguides, and a second position in proximal contact with the input member such that each second output waveguide frustrates the total internal reflection of a corresponding optical signal to receive the corresponding optical signal.

2. The optical switch of claim 1, wherein each second output waveguide comprises a contact surface operable to contact proximally the reflective surface of a corresponding input waveguide when the transmissive output member is placed in the second position.

3. The optical switch of claim 1, wherein:
the plurality of input waveguides comprises a plurality of input optical fibers;
the plurality of first output waveguides comprises a plurality of first output optical fibers; and
the plurality of second output waveguides comprises a plurality of second output optical fibers.

4. The optical switch of claim 3, wherein:
each input optical fiber comprises a core and a cladding;
each output optical fiber comprises a core and a cladding; and
a portion of the cladding of each input optical fiber is removed such that the core of each first output optical fiber is positioned proximal to the core of a corresponding input optical fiber.

5. The optical switch of claim 1, wherein:
the plurality of input waveguides comprises a plurality of planar waveguides;
the plurality of first output waveguides comprises a plurality of first output planar waveguides; and
the plurality of second output waveguides comprises a plurality of second output planar waveguides.

6. The optical switch of claim 1, wherein:
the plurality of input waveguides comprises a plurality of planar waveguides;
the plurality of first output waveguides comprises a plurality of first output optical fibers; and
the plurality of second output waveguides comprises a plurality of second output optical fibers.

7. The optical switch of claim 1, wherein:
the input member comprises a plurality of grooves, each groove extending from a first face to a second face of the input member;
the reflective output member comprises a plurality of grooves, each groove extending from a first face to a second face of the reflective output member; and
the transmissive output member comprises a plurality of grooves, each groove extending from a first face to a second face of the transmissive output member.

8. The optical switch of claim 7, wherein:
each input waveguide is positioned along a corresponding groove of the input member;
each first output waveguide is positioned along a corresponding groove of the reflective output member; and
each second output waveguide is positioned along a corresponding groove of the transmissive output member.

9. The optical switch of claim 8, wherein:
the grooves of the input member comprise V-grooves formed on a surface of the input member;
the grooves of the reflective output member comprise V-grooves formed on a surface of the reflective output member; and
the grooves of the transmissive output member comprise V-grooves formed on a surface of the transmissive output member.

10. The optical switch of claim 8, wherein:
the grooves of the input member comprise channels formed through the input member;
the grooves of the reflective output member comprise channels formed through the reflective output member; and
the grooves of the transmissive output member comprise channels formed through the transmissive output member.

11. The optical switch of claim 1, wherein:
the input member comprises a contact face that is at an angle substantially similar to the angle of the reflective surface of each input waveguide;
the transmissive output member comprises a contact face that is substantially parallel to the angle of the contact face of the input member; and
the contact face of the transmissive output member is in proximal contact with the contact face of the input member when the transmissive output member is placed in the second position.

12. The optical switch of claim 1, further comprising an actuator coupled to the transmissive output member and operable to place the transmissive output member in a selected one of the first position or the second position in response to a control signal.

13. The optical switch of claim 1, further comprising a baseplate, wherein the input member is aligned with the transmissive output member using a plurality of aligning rails.

14. The optical switch of claim 13, wherein each aligning rail comprises:
a V-groove formed on a surface of the baseplate;
a corresponding V-groove formed on a corresponding surface of the input member;

a corresponding V-groove formed on a corresponding surface of the transmissive output member; and an optical fiber placed in the channel formed by the corresponding V-grooves of the baseplate, the input member, and the transmissive output member.

15. The optical switch of claim 13, wherein each aligning rail comprises:

a V-groove formed on a surface of the input member;

a V-groove formed on a surface of the transmissive output member; and a corresponding ridge formed on a corresponding surface of the baseplate.

16. The optical switch of claim 13, wherein each aligning rail comprises a pin formed on a face of the input member, the pin operable to mate with a corresponding hole associated with the transmissive output member.

17. The optical switch of claim 1, further comprising a baseplate, wherein each of the first position and the second position of the transmissive output member is established using an aligning rail formed orthogonal to the direction of movement of the transmissive output member, the aligning rail comprising:

a first V-groove formed on a surface of the baseplate;

a second V-groove formed on a corresponding surface of the transmissive output member, the second V-groove having a width that is greater than the width of the first V-groove; and a fiber placed in the channel formed by the first V-groove and the second V-groove.

18. A method for processing a plurality of optical signals, comprising:

communicating a plurality of optical signals in a plurality of corresponding input waveguides, wherein each input waveguide is supported by an input member;

totally internally reflecting the optical signals at a reflective surface of each input waveguide such that the optical signals propagate toward a plurality of corresponding first output waveguides, wherein each first output waveguide is supported by a reflective output member coupled to the input member;

placing a transmissive output member in proximal contact with the input member such that a plurality of corresponding second output waveguides frustrate the total internal reflection of the optical signals; and receiving the optical signals in the corresponding second output waveguides.

19. The method of claim 18, wherein each second output waveguide comprises a contact surface operable to contact proximally the reflective surface of a corresponding input waveguide when the transmissive output member is placed in proximal contact with the input member.

20. The method of claim 18, wherein:

the plurality of input waveguides comprises a plurality of input optical fibers;

the plurality of first output waveguides comprises a plurality of first output optical fibers; and the plurality of second output waveguides comprises a plurality of second output optical fibers.

21. The method of claim 20, wherein:

the first input optical fibers are bundled in a first ribbon array;

the first output optical fibers are bundled in a second ribbon array; and the second output optical fibers are bundled in a third ribbon array.

22. The method of claim 18, wherein:

the plurality of input waveguides comprises a plurality of planar waveguides;

the plurality of first output waveguides comprises a plurality of first output planar waveguides; and the plurality of second output waveguides comprises a plurality of second output planar waveguides.

23. The method of claim 18, wherein:

the reflective surface of each input waveguide is at an angle with respect to the longitudinal axis of the input waveguide; and each second output waveguide comprises a contact surface that is substantially parallel to the angle of the reflective surface of a corresponding input waveguide.

24. The method of claim 18, wherein:

the plurality of input waveguides comprises a plurality of planar waveguides;

the plurality of first output waveguides comprises a plurality of first output optical fibers; and the plurality of second output waveguides comprises a plurality of second output optical fibers.

25. The method of claim 18, further comprising aligning the input member with the transmissive output member using a baseplate and a plurality of aligning rails.

26. The method of claim 25, wherein each aligning rail comprises:

a V-groove formed on a surface of the baseplate;

a corresponding V-groove formed on a corresponding surface of the input member;

a corresponding V-groove formed on a corresponding surface of the transmissive output member; and an optical fiber placed in the channel formed by the corresponding V-grooves of the baseplate, the input member, and the transmissive output member.

27. The method of claim 25, wherein each aligning rail comprises:

a V-groove formed on a surface of the input member;

a V-groove formed on a surface of the transmissive output member; and a ridge formed on a corresponding surface of the baseplate.

28. The method of claim 25, wherein each aligning rail comprises a pin formed on a face of the input member, the pin operable to mate with a corresponding hole associated with the transmissive output member.

* * * * *